United States Patent
Hirano et al.

(10) Patent No.: US 12,377,884 B2
(45) Date of Patent: Aug. 5, 2025

(54) REMOTE ASSISTANCE MANAGEMENT FOR REDUCING THE LOAD OF OPERATORS BY REMOTE ASSISTANCE PREDICTION AND CATEGORIZATION

(71) Applicant: TOYOTA JIDOSHA KABUSHIKI KAISHA, Toyota (JP)

(72) Inventors: Maiko Hirano, Nagoya (JP); Koji Taguchi, Sagamihara (JP); Kentaro Ichikawa, Shizuoka-ken (JP); Yoshitaka Adachi, Koto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 245 days.

(21) Appl. No.: 17/735,186

(22) Filed: May 3, 2022

(65) Prior Publication Data

US 2022/0355827 A1 Nov. 10, 2022

(30) Foreign Application Priority Data

May 7, 2021 (JP) ................................ 2021-079315

(51) Int. Cl.
*B60W 60/00* (2020.01)

(52) U.S. Cl.
CPC ..... *B60W 60/0053* (2020.02); *B60W 2556/40* (2020.02); *B60W 2556/45* (2020.02)

(58) Field of Classification Search
CPC ......... B60W 60/0053; B60W 2556/40; B60W 2556/45; G05D 1/0027; G08G 1/096725; G08G 1/0969
See application file for complete search history.

(56) References Cited

U.S. PATENT DOCUMENTS

| | | | |
|---|---|---|---|
| 2017/0192423 A1* | 7/2017 | Rust | G05D 1/0212 |
| 2018/0158323 A1 | 6/2018 | Takenaka et al. | |
| 2019/0163176 A1* | 5/2019 | Wang | G05D 1/0027 |
| 2020/0202705 A1 | 6/2020 | Sakai et al. | |
| 2020/0239023 A1* | 7/2020 | Srinivasan | G05D 1/228 |

(Continued)

FOREIGN PATENT DOCUMENTS

| | | |
|---|---|---|
| CN | 112394722 A | 2/2021 |
| JP | 2018-010406 A | 1/2018 |

(Continued)

*Primary Examiner* — James J Lee
*Assistant Examiner* — Alexander George Matta
(74) *Attorney, Agent, or Firm* — Sughrue Mion, PLLC

(57) ABSTRACT

A remote assistance management system is in communication with autonomous traveling vehicles for letting an operator provide remote assistance in response to an assistance request from a vehicle. The system predicts an occurrence of an assistance request in future based on operation states of the vehicles, and categorize a cause of an assistance request predicted to occur into a first category cause that lasts for a long time and a second category cause that lasts only for a short time. The system receives an assistance request from the vehicles. In response to acquiring a first assistance request of which the cause is the first category cause from a first vehicle, the system transmits a first command signal for the first vehicle that is decided by an operator to the first vehicle, and applies the first command signal to another vehicle from which the first assistance request is predicted to occur.

11 Claims, 12 Drawing Sheets

(56) References Cited

U.S. PATENT DOCUMENTS

| | | | |
|---|---|---|---|
| 2021/0031797 A1 | 2/2021 | Hayashida et al. | |
| 2021/0041894 A1* | 2/2021 | Urano | G05D 1/0223 |
| 2021/0048814 A1* | 2/2021 | Ghorbanian-Matloob | G05D 1/0027 |
| 2021/0318684 A1* | 10/2021 | Woltermann | G01C 21/3691 |
| 2023/0077852 A1* | 3/2023 | Watanabe | G01C 21/3453 |
| | | | 701/533 |

FOREIGN PATENT DOCUMENTS

| | | |
|---|---|---|
| JP | 2020-042764 A | 3/2020 |
| JP | 2020-102159 A | 7/2020 |

\* cited by examiner

REMOTE ASSISTANCE MANAGEMENT FOR REDUCING THE LOAD OF OPERATORS BY REMOTE ASSISTANCE PREDICTION AND CATEGORIZATION

CROSS-REFERENCE TO RELATED APPLICATION

The present application claims priority under 35 U.S.C. § 119 to Japanese Patent Application No. 2021-079315, filed May 7, 2021, the contents of which application are incorporated herein by reference in their entirety.

BACKGROUND

Field

The present disclosure relates to a remote assistance management technique in communication with a plurality of autonomous traveling vehicles for letting an operator provide remote assistance in response to an assistance request from an autonomous traveling vehicle.

Background Art

An autonomous traveling vehicle continues traveling autonomously. However, there are cases where autonomous determination of the autonomous traveling vehicle is uncertain or more sure safety determination is required. Therefore, rather than leaving everything to the autonomous determination of the autonomous traveling vehicle, assisting the autonomous traveling of the autonomous traveling vehicle by an operator has been considered. In the assisting, the operator is required to monitor the autonomous traveling vehicle remotely and, if necessary, transmit the determination and remote driving instruction to the vehicle. One of prior arts related to such a remote assistance management system is disclosed in JP2020-102159A.

In the prior art disclosed in JP2020-102159A, a plurality of autonomous traveling vehicles are connected to a server via a network. The server refers to vehicle state information received from a vehicle to detect a candidate that may have occurred in the vehicle or its surroundings, and causes an operator to confirm whether or not an abnormality has actually occurred in the candidate. When the server is notified by the vehicle that some abnormality has occurred, the server creates a traveling instruction according to the content of the abnormality and transmits the traveling instruction to the vehicle, and notifies the operator of the content of the traveling instruction in the order of priority according to the content of the abnormality. The operator views the content of the traveling instruction transmitted to the vehicle, confirms the traveling instruction, or changes or adds the traveling instruction. When the traveling instruction is changed or added by the operator, the server creates the changed or added traveling instruction and transmits it to the vehicle.

According to the prior art disclosed in JP2020-102159A, confirmation by an operator is performed in order from a vehicle in which an abnormality having a high priority to be processed occurs. This prevents abnormal vehicles from obstructing traffic, and facilitates the traffic as a whole autonomous traveling system.

Thus, in the remote assistance management system, the role of the operator to remotely monitor and operate the autonomous traveling vehicle is important. If a thorough system that can respond promptly to assistance requests from autonomous traveling vehicles is necessary, the greater the number of operators relative to the total number of autonomous traveling vehicles, the better.

However, the greater the number of operators, the higher the personnel costs. This makes it difficult to establish the remote assistance management system as a business. On the other hand, if the number of operators is simply reduced, not only the load per operator becomes high, but also when assistance requests of more than the number of operators arrive from autonomous traveling vehicles, it becomes impossible to cope with the requests. In this case, an autonomous traveling vehicle that does not receive a determination or traveling instruction from the operator may be stalled on a road, and a trouble may occur by an autonomous traveling vehicle traveling with uncertain information.

As references showing the technical level of the technical field related to the present disclosure, JP2018-010406A and JP2020-042764A can be exemplified in addition to JP2020-102159A.

SUMMARY

The present disclosure has been made in view of the above-mentioned problems, and an object thereof is to provide a technique capable of reducing the load of operators required for remote assistance of autonomous traveling vehicles while maintaining smooth traffic by the remote assistance.

The present disclosure provides a remote assistance management system for achieving the above object. The remote assistance management system according to the present disclosure is a system in communication with a plurality of autonomous traveling vehicles for letting an operator provide remote assistance in response to an assistance request from an autonomous traveling vehicle. The remote assistance management system includes at least one memory including at least one program, and at least one processor coupled with the at least one memory. The at least one program causes the at least one processor to predict the occurrence of an assistance request in future based on operation states of the plurality of autonomous traveling vehicles, and categorize a cause of an assistance request predicted to occur into a first category cause that lasts for a long time and a second category cause that lasts only for a short time. The at least one program causes the at least one processor to receive an assistance request from the plurality of autonomous traveling vehicles. Then, the at least one program causes the at least one processor to, in response to acquiring a first assistance request of which the cause is the first category cause from a first vehicle, transmit a first command signal for the first vehicle that is decided by an operator to the first vehicle and apply the first command signal to another autonomous traveling vehicle from which the first assistance request is predicted to occur.

According to the present remote assistance management system, the occurrence of an assistance request in future is predicted for a plurality of autonomous traveling vehicles, and the cause of the assistance request is categorized. Then, when obtaining from the first vehicle the first assistance request caused by the first category cause that lasts for a long time, the first command signal for the first vehicle determined by an operator is also applied to another autonomous traveling vehicle from which the first assistance request is predicted to occur. That is, normally, the determination of a command signal by an operator and remote assistance by the command signal is performed for each assistance request, but for the assistance requests generated from the same cause, the same command signal as that determined by the operator is used. Thus, the number of autonomous traveling vehicles to be remotely assisted by the operators is reduced. This makes it possible to reduce the load of operators performing remote assistance of the autonomous traveling vehicles while maintaining smooth traffic by the remote assistance.

In the remote assistance management system, the at least one program may cause the at least one processor to further execute setting an effective period during which the first command signal is applied to another autonomous traveling vehicle from which the first assistance request is predicted to occur. Alternatively, the at least one program may cause the at least one processor to further execute setting an effective period during which the cause of the first assistance request is categorized into the first category cause. The cause that generates the assistance request does not last indefinitely, even if it is the first category cause that lasts for a long time. By setting an effective period to applying the first command signal to another autonomous traveling vehicle from which the first assistance request is predicted to occur, or by setting an effective period to categorizing the cause of the first assistance request into the first category cause, it is possible to cope with a condition change of the cause of the first assistance request. These effective periods may be set based on an input from an operator, or a default value may be set in advance.

In the remote assistance management system, the at least one program may cause the at least one processor to further execute, in response to acquiring a second assistance request of which the cause is the second category cause from a second vehicle, applying a second command signal for the second vehicle that is decided by an operator only to the second vehicle. If the cause generating the assistance request is the second category cause that lasts only for a short time, the operator determines a command signal each time the assistance request is acquired, thereby providing appropriate remote assistance by the operator to the autonomous traveling vehicle that requires assistance.

Further, when the occurrence of the second assistance request is predicted, the at least one program may cause the at least one processor to further execute arranging an operator to an autonomous traveling vehicle from which the second assistance request is predicted to occur in preference to an autonomous traveling vehicle from which the first assistance request is predicted to occur. When the assistance request acquired from an autonomous traveling vehicle is the first assistance request, the command signal for the autonomous traveling vehicle is applied not only to the autonomous traveling vehicle but also to another autonomous traveling vehicle from which the first assistance request is predicted to occur. This makes it possible to reduce monitoring load of an operator for another autonomous traveling vehicle from which the first assistance request is predicted to occur. Therefore, it is possible to optimize the arrangement of operators by arranging an operator to the autonomous traveling vehicle from which the second assistance request is predicted to occur in preference to the autonomous traveling vehicle from which the first assistance request is predicted to occur.

In the remote assistance management system, the at least one program may cause the at least one processor to predict an occurrence of an assistance request in future by referring to map data with which statistical information related to past remote assistance is associated. Further, the at least one program may cause the at least one processor to categorize a cause of an assistance request predicted to occur by referring to the map data. By associating the map data with the statistical information related to the past remote assistance, it is possible to determine whether or not there is a place with a statistically high occurrence probability of an assistance request on the traveling route of the autonomous traveling vehicle. This improves the accuracy of prediction of the occurrence of an assistance request and also improves the accuracy of categorization of the cause of the assistance request. Incidentally, the map data may be associated with at least one of latest construction information and latest accident information. By associating at least one of the latest construction information and the latest accident information to the map data, the accuracy of prediction of the occurrence of an assistance request can be improved, and also the accuracy of categorization of the cause of the assistance request can be improved.

In the remote assistance management system, the at least one memory and the at least one processor may be provided on a server in communication with the plurality of autonomous traveling vehicles. In this case, the server may acquire operation states of the plurality of autonomous traveling vehicles respectively, and predict the occurrence of an assistance request in future based on the operation states of the plurality of autonomous traveling vehicles by referring to the map data. By comprehensively predicting the occurrence of an assistance request based on the operation states of the plurality of autonomous traveling vehicles in the server, it is possible to improve the accuracy of prediction of the occurrence of an assistance request. Incidentally, the operation states may be obtained from respective autonomous traveling vehicles, and also may be obtained from an operation management server for managing operations of autonomous traveling vehicles.

In the remote assistance management system, the at least one memory and the at least one processor may be distributed to an on-board computer mounted on each of the plurality of autonomous traveling vehicles and a server in communication with the on-board computer. In this case, the on-board computer may acquire an operation state of a target autonomous traveling vehicle on which the on-board computer is mounted using a sensor of the target autonomous traveling vehicle, acquire the map date from the server, and predict the occurrence of an assistance request in future based on the operation state of the target autonomous traveling vehicle by referring to the map data. Then, when an assistance request is predicted to occur, information relating to prediction of the occurrence of the assistance request may be transmitted from the on-board computer to the server. By acquiring the operation state of the target autonomous traveling vehicle using the sensor of the target autonomous traveling vehicle on which the on-board computer is mounted, the occurrence of an assistance request from the target autonomous traveling vehicle can be predicted with high responsiveness.

Further, the present disclosure provides a remote assistance management method for achieving the above object. The remote assistance management method according to the present disclosure is a remote assistance management method for a plurality of autonomous traveling vehicles capable of receiving remote assistance from an operator. The remote assistance management method includes a step of predicting the occurrence of an assistance request in future from the plurality of autonomous traveling vehicles to an operator based on operation states of the plurality of autonomous traveling vehicles, and a step of categorizing a cause of an assistance request predicted to occur into a first category cause that lasts for a long time and a second category cause that lasts only for a short time. Further, the remote assistance management method includes a step of, in response to acquiring a first assistance request of which the cause is the first category cause from a first vehicle, transmitting a first command signal for the first vehicle that is decided by an operator to the first vehicle, and a step of applying the first command signal to another autonomous traveling vehicle from which the first assistance request is predicted to occur.

Further, the present disclosure provides a remote assistance management program for achieving the above object. The remote assistance management program according to the present disclosure is a program causing a computer to communicate with a plurality of autonomous traveling vehicles and let an operator provide remote assistance in response to an assistance request from an autonomous traveling vehicle. The remote assistance management program causes the computer to execute predicting the occurrence of an assistance request in future based on operation states of the plurality of autonomous traveling vehicles, categorizing a cause of an assistance request predicted to occur into a first category cause that lasts for a long time and a second category cause that lasts only for a short time, and receiving an assistance request from the plurality of autonomous traveling vehicles. Further, the remote assistance management program causes the computer to execute, in response to acquiring a first assistance request of which the cause is the first category cause from a first vehicle, transmitting a first command signal for the first vehicle that is decided by an operator to the first vehicle, and applying the first command signal to another autonomous traveling vehicle from which the first assistance request is predicted to occur. The remote assistance management program may be recorded on a non-transitory computer-readable storage medium.

According to the remote assistance management method and the remote assistance management program described above, the occurrence of an assistance request in future is predicted for a plurality of autonomous traveling vehicles, and the cause of the assistance request is categorized. Then, when obtaining from the first vehicle the first assistance request caused by the first category cause that lasts for a long time, the first command signal for the first vehicle determined by an operator is also applied to another autonomous traveling vehicle from which the first assistance request is predicted to occur. That is, normally, the determination of a command signal by an operator and remote assistance by the command signal is performed for each assistance request, but for the assistance requests generated from the same cause, the same command signal as that determined by the operator is used. Thus, the number of autonomous traveling vehicles to be remotely assisted by the operators is reduced. This makes it possible to reduce the load of operators performing remote assistance of the autonomous traveling vehicles while maintaining smooth traffic by the remote assistance.

As described above, according to the remote assistance management system, the remote assistance management method, and the remote assistance management program according to the present disclosure, it is possible to reduce the load of operators performing remote assistance of the autonomous traveling vehicles while maintaining smooth traffic by the remote assistance.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly designated by the numerals theoretically. Furthermore, structures that are described in the embodiments shown as follows are not always indispensable to the disclosure unless specially explicitly shown otherwise, or unless the disclosure is explicitly designated by the structures or the steps theoretically.

1. Basic Configuration of Remote Assistance Management System

Figure 1:
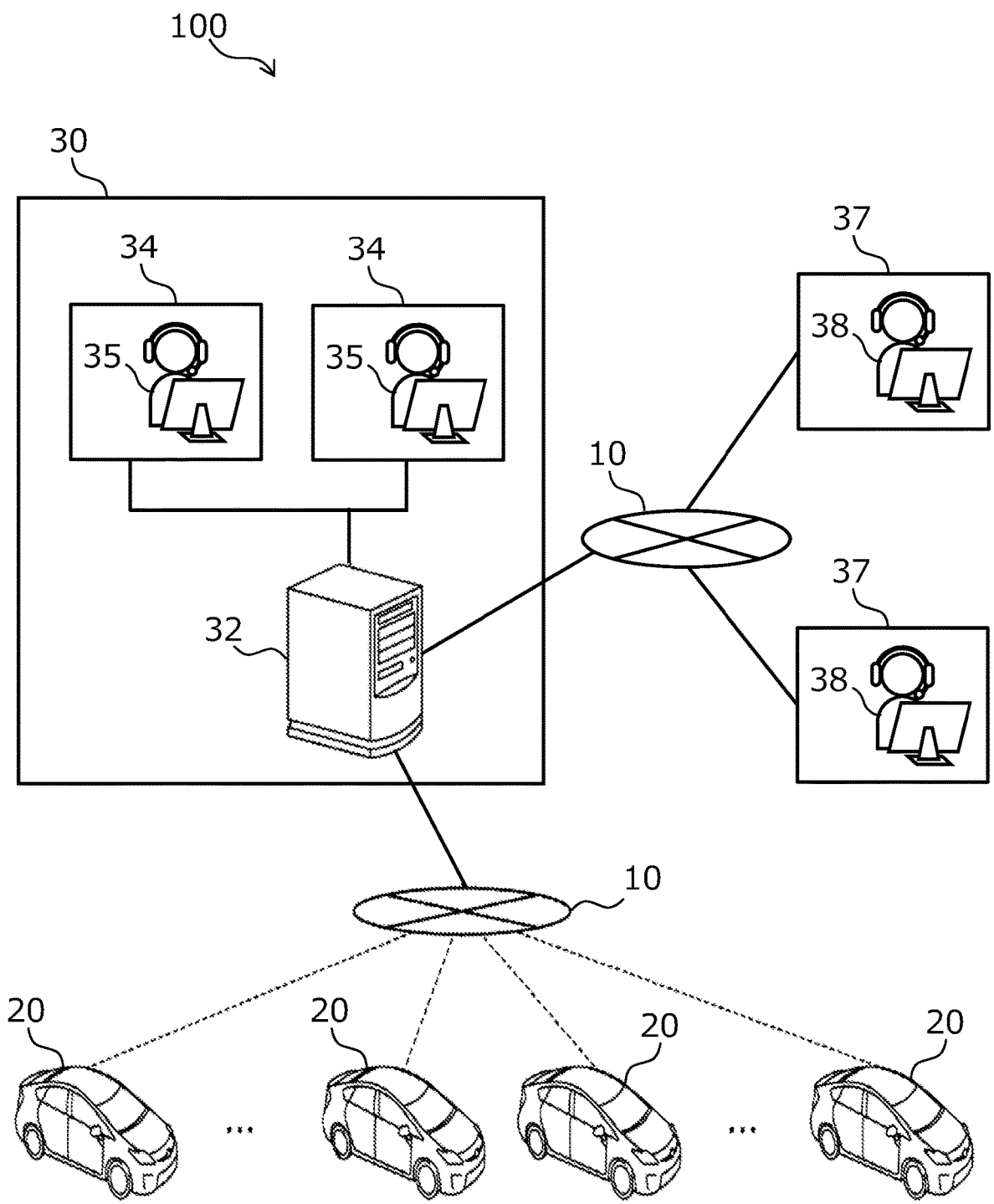
FIG. 1 is a configuration diagram of a remote monitoring system for autonomous traveling vehicles.

FIG. 1 is a configuration diagram of a remote monitoring system for autonomous traveling vehicles. The remote monitoring system 100 is a system for remotely monitoring autonomous traveling vehicles 20 by remote operators 35, 38. Hereinafter, a remote operator is simply referred to as an operator. The autonomous traveling level of autonomous traveling vehicles 20 to be subject to remote monitoring is assumed to be level 4 or level 5, for example. Hereinafter, an autonomous traveling vehicle is simply referred to as a vehicle. A vehicle representing the plurality of vehicles is referred to as a "vehicle 20", and the entirety of the plurality of vehicles is referred to as "vehicles 20".

The operators 35, 38 include, for example, in-house operators 35 that monitor vehicles 20 in a monitoring center 30, and outside operators 38 that monitor vehicles 20 at home. A server 32 is installed in the monitoring center 30. Operation terminals 34 operated by the in-house operators 35 are connected to the server 32 through a LAN in the monitoring center 30. Operation terminals 37 operated by the outside operators 38 are connected to the server 32 via a communication network 10 including the Internet. The number of the operation terminals 34, 37 is prepared in accordance with the number of the operators 35, 38.

One function of the remote monitoring system 100 is remote assistance management of vehicles 20. A system for performing remote assistance management is a remote assistance management system according to each embodiment of the present disclosure. In a first embodiment, the server 32 in the monitoring center 30 functions as the remote assistance management system, and in a second embodiment, the server 32 in the monitoring center 30 and on-board computers of the vehicles 20 constitute the remote assistance management system. The server 32 is connected to vehicles 20 via the communication network 10 including 4G and 5G.

The remote assistance management system is a system that communicates with vehicles traveling autonomously and lets an operator provide remote assistance in response to an assistance request from a vehicle. In the remote assistance, at least a part of determination for autonomous traveling by the vehicle is performed by the operator. Basic calculations of perception, determination, and operation required for traveling are performed in the vehicle. The operator, based on information transmitted from the vehicle, determines an action to be taken by the vehicle, and instructs it to the vehicle. The remote assistance commands sent from the operator to the vehicle include a command to advance the vehicle and a command to stop the vehicle. The remote assistance command may include an offset avoidance command for avoiding an obstacle in front, an overtaking command for overtaking a preceding vehicle, an emergency evacuation command, and the like.

The skills of the operators 35, 38 for remote assistance are not uniform. The In-house operators 35 are divided into operators with high skills and operators with low skills. Similarly, the outside operators 38 are divided into operators with high skills and operators with low skills. In general, the utilization costs (personnel costs) of operators with high skills are relatively high, and the utilization costs of operators with low skills are relatively low. The number of the operators 35, 38 is one or more, preferably two or more. In particular, it is preferred that at least one in-house operator 35 with high skills exists. Hereinafter, an operator representing the plurality of operators may be referred to as an "operator 35, 38", and the entirety of the plurality of operators may be referred to as "operators 35, 38".

Figure 2:
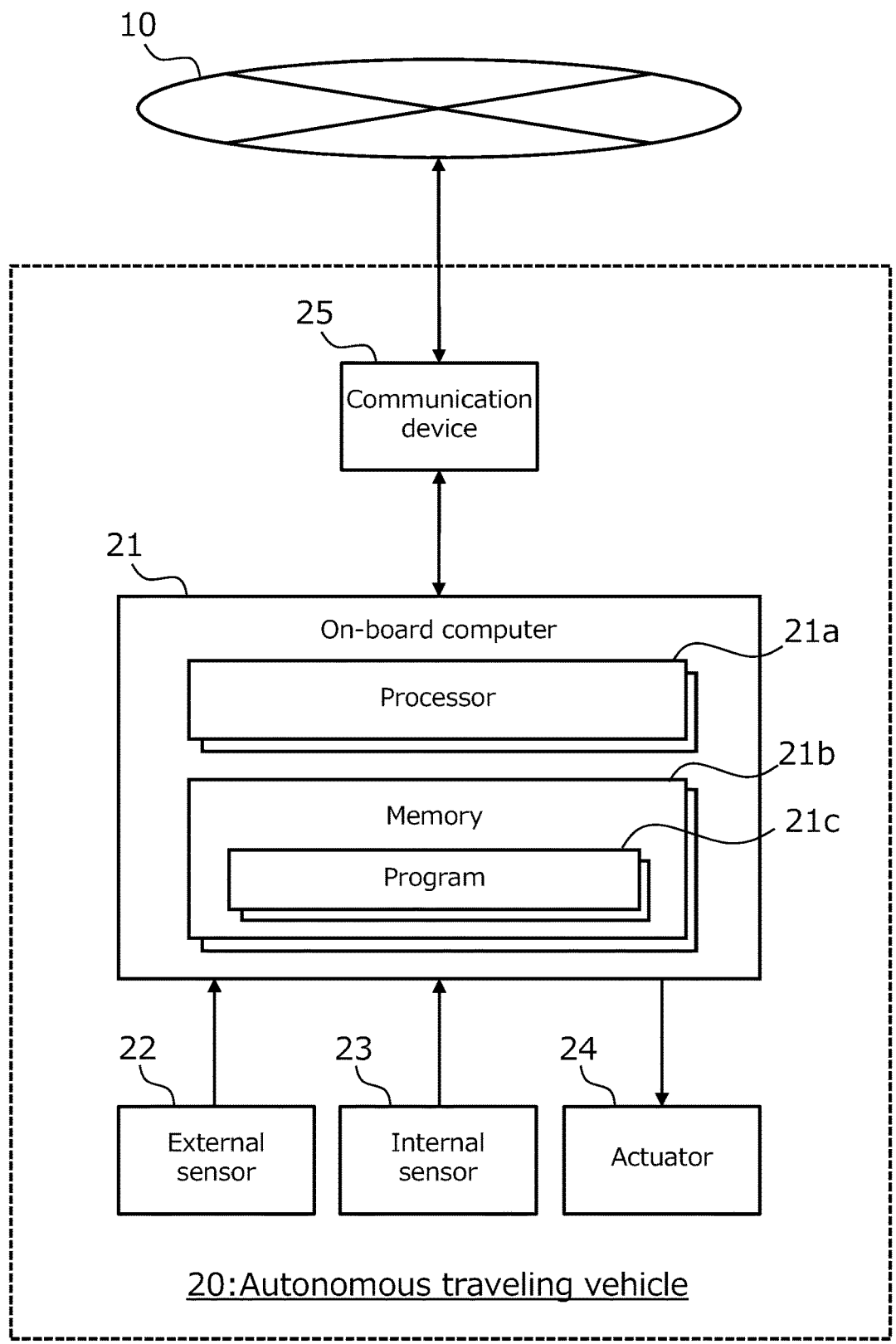
FIG. 2 is a block diagram showing an example of a configuration of an autonomous traveling vehicle.

FIG. 2 is a block diagram showing an example of a configuration of the vehicle 20. The vehicle 20 includes an on-board computer 21. The on-board computer 21 is an assembly of a plurality of ECUs (Electronic Control Unit) mounted on the vehicle 20. The vehicle 20 also includes an external sensor 22, an internal sensor 23, an actuator 24, and a communication device 25. These are connected to the on-board computer 21 using in-vehicle networks such as Controller Area Network.

The on-board computer 21 includes one or more processors 21a (hereinafter, simply referred to as a processor 21a) and one or more memories 21b (hereinafter, simply referred to as a memory 21b) coupled to the processor 21a. The memory 21b stores one or more programs 21c (hereinafter, simply referred to as a program 21c) executable by the processor 21a and various related information.

When the processor 21a executes the program 21c, various kinds of processing performed by the processor 21a are realized. The program 21c includes, for example, a program for realizing autonomous traveling and a program for realizing remote assistance. In the case of the second embodiment, the program 21c includes a program for causing the on-board computer 21 to function as a part of the remote assistance management system. The memory 21b includes a non-transitory computer-readable storage medium that includes a main storage device and an auxiliary storage device. The program 21c may be stored in the main storage device or may be stored in the auxiliary storage device. The auxiliary storage device may store a map database for managing map data.

The external sensor 22 includes a camera for photographing surroundings of the vehicle 20, particularly in front of the vehicle 20. A plurality of cameras may be provided in the vehicle 20, and may photograph side and rear of the vehicle 20. Further, the camera may be shared between autonomous traveling and remote assistance by an operator, or the camera for autonomous traveling and the camera for remote assistance may be provided separately.

The external sensor 22 includes a perception sensor in addition to the camera. The perception sensor is a sensor that acquires information for perceiving surrounding conditions of the vehicle 20. Examples of the perception sensor other than the camera include a LiDAR (Laser Imaging Detection and Ranging) and a millimeter-wave radar. The external sensor 22 also includes a location sensor for detecting the location and orientation of the vehicle 20. As the location sensor, a Global Positioning System (GPS) sensor is exemplified. Information acquired by the external sensor 22 is transmitted to the on-board computer 21. The external sensor 22 also includes a microphone that collects sound around the vehicle 20.

The inner sensor 23 includes a state sensor that acquires information about the motion of the vehicle 20. As the state sensor, for example, a wheel speed sensor, an acceleration sensor, an angular velocity sensor, and a steering angle sensor are exemplified. The acceleration sensor and the angular velocity sensor may constitute an IMU. Information acquired by the internal sensor 23 is transmitted to the on-board computer 21. Hereinafter, the information acquired by the internal sensor 23 and the information acquired by the external sensor 22 are collectively referred to as operation state information of the vehicle 20. However, the operation state information includes not only the information acquired by sensors of the vehicle 20 but also information such as a target trajectory calculated by an autonomous traveling system of the vehicle 20, and information acquired by an operation management server that manages the operation of the vehicle 20.

The actuator 24 includes a steering system for steering the vehicle 20, a driving system for driving the vehicle 20, and a braking system for braking the vehicle 20. The steering system includes, for example, a power steering system, a steer-by-wire steering system, and a rear wheel steering system. The driving system includes, for example, an engine system, an EV system, and a hybrid system. The braking system includes, for example, a hydraulic braking system and a power regenerative braking system. The actuator 24 operates by a control signal transmitted from the on-board computer 21.

The communication device 25 is a device for controlling wireless communication with the outside of the vehicle 20. The communication device 25 communicates with the server 32 via the communication network 10. Information processed by the on-board computer 21 is transmitted to the server 32 using the communication device 25. Information processed by the server 32 is captured by the on-board computer 21 using the communication device 25. Also, if vehicle-to-vehicle communication with other vehicles or road-to-vehicle communication with infrastructure facilities is required for autonomous traveling, communication with those external devices is also performed by the communication device 25.

Figure 3:
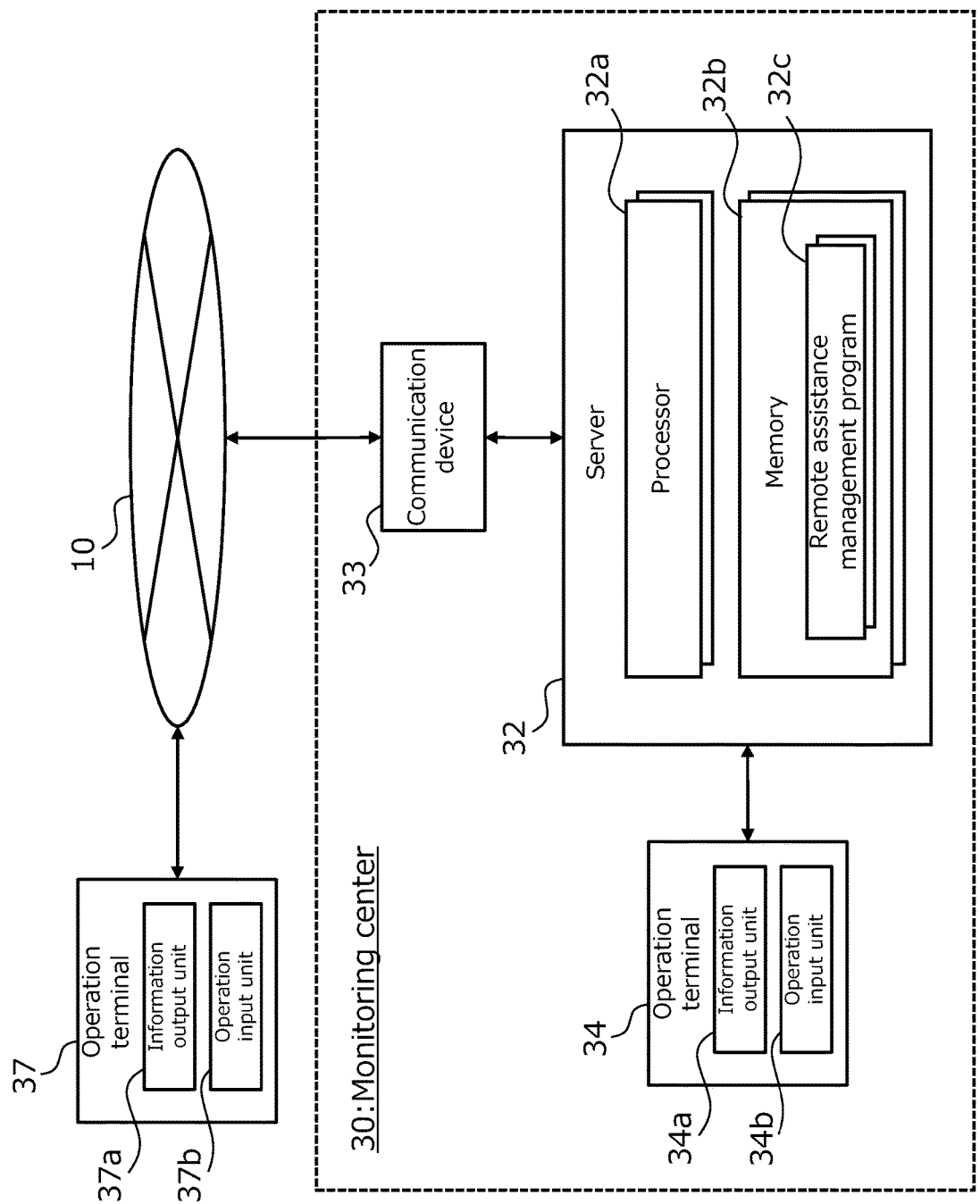
FIG. 3 is a block diagram showing an example of a configuration of a monitoring center.

FIG. 3 is a block diagram showing an example of a configuration of the monitoring center 30. In the monitoring center 30, a communication device 33 and one or more operation terminals 34 (an operation terminal representing the one or more operation terminals 34 is referred to as an "operation terminal 34") are installed in addition to the server 32. The communication device 33 is a device for controlling communication with the outside of the monitoring center 30. The communication device 33 mediates communication between the server 32 and the vehicles 20 via the communication network 10. The information processed by the server 32 is transmitted to the vehicle 20 using the communication device 33. The information processed by the vehicle 20 is captured by the server 32 using the communication device 33. The communication device 33 mediates communication between the server 32 and one or more operation terminals 37 (an operation terminal representing the one or more operation terminals 37 is referred to as an "operation terminal 37") installed outside the monitoring center 30.

The server 32 may be a computer or a set of computers connected by a communication network. The server 32 includes one or more processors 32a (hereinafter simply referred to as a processor 32a) and one or more memories 32b (hereinafter simply referred to as a memory 32b) coupled to the processor 32a. The memory 32b stores one or more programs 32c (hereinafter, simply referred to as a program 32c) executable by the processor 32a and various related information.

When the processor 32a executes the program 32c, various kinds of processing performed by the processor 32a are realized. In the first embodiment, the program 32c includes a program (remote assistance management program) that causes the server 32 to function as the remote assistance management system. In the second embodiment, the program 32c includes a program that causes the server 32 to function as a part of the remote assistance management system. The memory 32b includes a non-transitory computer-readable storage medium that includes a main storage device and an auxiliary storage device. The program 32c may be stored in the main storage device or may be stored in the auxiliary storage device. The auxiliary storage device may store a map database for managing map data. The map database may be stored in at least one of the server 32 and the on-board computer 21.

The operation terminals 34, 37 comprises information output units 34a, 37a respectively. The information output units 34a, 37a are devices for outputting information necessary for remote assistance of the vehicle 20 to the operators 35, 38. Information output from the information output units 34a, 37a is transmitted from the server 32 to the respective operation terminals 34, 37. The information output unit 34a, 37a includes a display for outputting images and a speaker for outputting sounds. On the display, for example, an image in front of the vehicle 20 photographed by the camera of the vehicle 20 is displayed. The display may have a plurality of display screens and may display images of the side and/or the rear of the vehicle 20. The speaker, for example, communicates sounds of surroundings of the vehicle 20 collected by the microphone to the operator.

The operation terminals 34, 37 include operation input units 34b, 37b respectively. The operation input units 34b, 37b are devices for inputting operations for remote assistance from the operators 35, 38. Information input by the operation input units 34b, 37b is transmitted from the server 32 to the vehicles 20 corresponding to the operation input units 34b, 37b, respectively. Examples of the input device include a button, a lever, and a touch panel. For example, advance/stop or a lateral movement may be instructed to the vehicle 20 by the direction in which the lever is tilted. The lateral movement includes, for example, offset avoidance against an obstacle ahead, lane changing, and overtaking of a preceding vehicle.

2. Summary of Remote Assistance Management System

Figure 4:
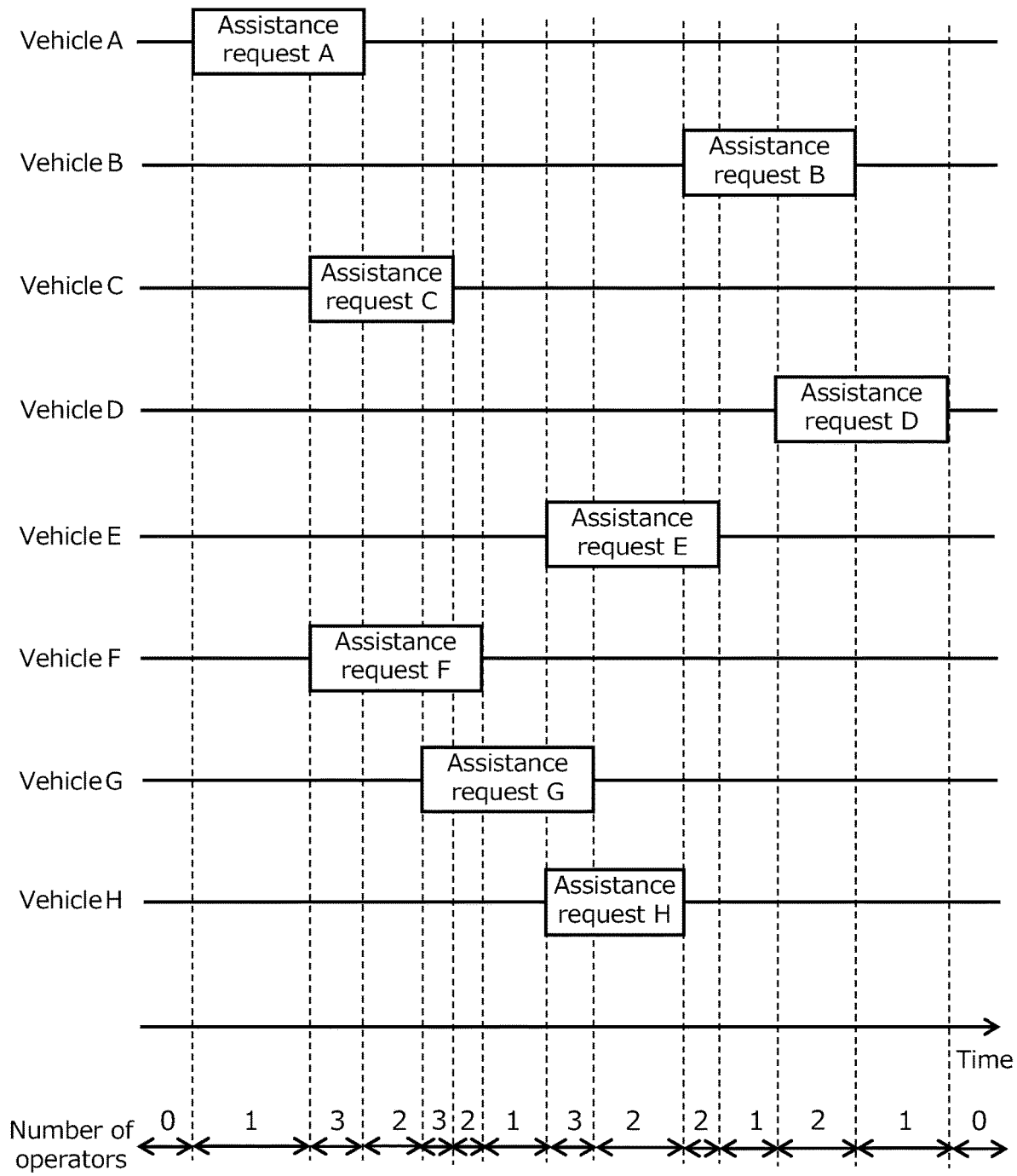
FIG. 4 is a diagram showing an example of load of operators when assistance requests occur from a plurality of autonomous traveling vehicles.

It is an object of the remote assistance management system of the present disclosure to reduce the loads of the operators required for remote assistance of vehicles while maintaining smooth traffic by the remote assistance. Hereinafter, the load of the operators will be described in the case where assistance requests are generated from a plurality of vehicles with reference to FIG. 4. FIG. 4 shows an example of the load of the operators when assistance requests occur from eight vehicles A-H in a situation where these eight vehicles A-H are in operation. The load of the operators means the number of operators required for handling assistance requests.

In the example shown in FIG. 4, assistance requests are generated from the respective vehicles A-H at discrete times. The horizontal axis of the chart represents time, and the length of each rectangle corresponding to each assistance request represents the time required for handling each assistance request, that is, the assistance time. The assistance time required depends on the content of each assistance request. In the example shown in FIG. 4, assistance times overlap at the same time between a plurality of assistance requests. For example, the assistance request E overlaps with the assistance request G, and at the same time overlaps with the assistance request H. In this way, when assistance requests overlap at the same time, as many operators as the number of overlapping assistance requests are required. In the example shown in FIG. 4, the maximum number of operators is three. However, if there are only two operators, any one of three assistance requests cannot be handled, resulting in a failure. A situation in which an operator cannot be assigned to an assistance request is called an operator failure.

The remote assistance management system of the present disclosure executes processing for preventing the above-described failure. The remote assistance management system of the present disclosure predicts the occurrence of an assistance request in future based on an operation state of each vehicle. Here, a cause of remote assistance for a vehicle (hereinafter, referred to as an assistance cause) can be broadly categorized into two categories. The first is an assistance cause that lasts for a long time once it occurs. Such an assistance cause is called a first category cause. The second is an assistance cause other than the first category cause, i.e., one that lasts only for a short time after the occurrence. Such an assistance cause is called a second category cause. The remote assistance management system of the present disclosure categorizes the assistance cause of a predicted assistance request into the first category cause and the second category cause.

As a concrete example of the first category cause, the response to lane reduction due to road construction may be mentioned. Passing through an area where lanes have reduced due to road construction is an assistance cause requiring remote assistance by an operator because it is difficult to respond with autonomous traveling. Since road construction continues for a relatively long period of time, the assistance cause also continues to exist for a long period of time. In addition, the response to lane reduction due to road construction is not dependent on individual vehicles, but is an assistance cause common to all vehicles passing through the area where the road construction is being carried out. That is, the assistance cause categorized as the first category cause is also an assistance cause that does not depend on individual vehicles. As other examples of the assistance cause corresponding to the first category cause, there may be mentioned the followings.

Response to road closure construction

Response to lane regulation or road closure due to an accident

Determination of traffic availability of a lane on a bridge whose direction is switched by time zone Response to protrusion of plant into a lane Response to a road that have been updated to a map being used (e.g., a lane has been redrawn) (however, in the case of an autonomous traveling system in which map renewal is immediately possible, this is not a long-lasting assistance cause, and is categorized into the second category cause, which will be described later).

As a specific example of the second category cause, distinguishing the lighting color of a signal may be mentioned. If the autonomous traveling system cannot distinguish the light color of the signal, prompt remote assistance by an operator is required. However, the light color of the signal changes according to the time, and the difficulty of distinguishing the light color also changes according to the time and the positional relationship with the camera of the vehicle. In other words, the assistance cause of distinguishing the light color of the signal depends on individual vehicles and lasts only for a short time. As can be seen from the example of distinguishing the light color of the signal, it can be said that the assistance cause categorized as the second category cause is the cause which requires assistance by an operator immediately when the vehicle encounters a corresponding scene. As other examples of the assistance cause corresponding to the second category cause, there may be mentioned the followings.

Confirmation of presence or absence of a pedestrian on a crosswalk

Confirmation of an oncoming vehicle running out to an opposite lane for avoiding an illegally parked vehicle Response to a pedestrian or a vehicle not compliant with traffic rules Determination in a situation where lane change or merging is difficult only by determination by an automatic driving vehicle for some reason including surrounding congestion Determination in a situation where a place registered as a stopping location is covered with another vehicle or an obstacle and the stopping location cannot be determined by the autonomous traveling vehicle Response to a case where another vehicle gives way for some reason Determination to enter 4-way stop or roundabout Determination to overtake of a bicycle that is not illegal but runs in parallel on a roadway In the case of the first category cause, assistance requests caused by the same assistance cause may occur not only from one vehicle but also from a plurality of vehicles at different times. This is also evident from the example of the lane reduction due to road construction. For all vehicles passing through an area where road construction is being carried out, remote assistance is required to cope with the lane reduction. In this case, it is considered that the content of the remote assistance performed by an operator to one vehicle can be continuously applied to other vehicles following the one vehicle.

Figure 5:
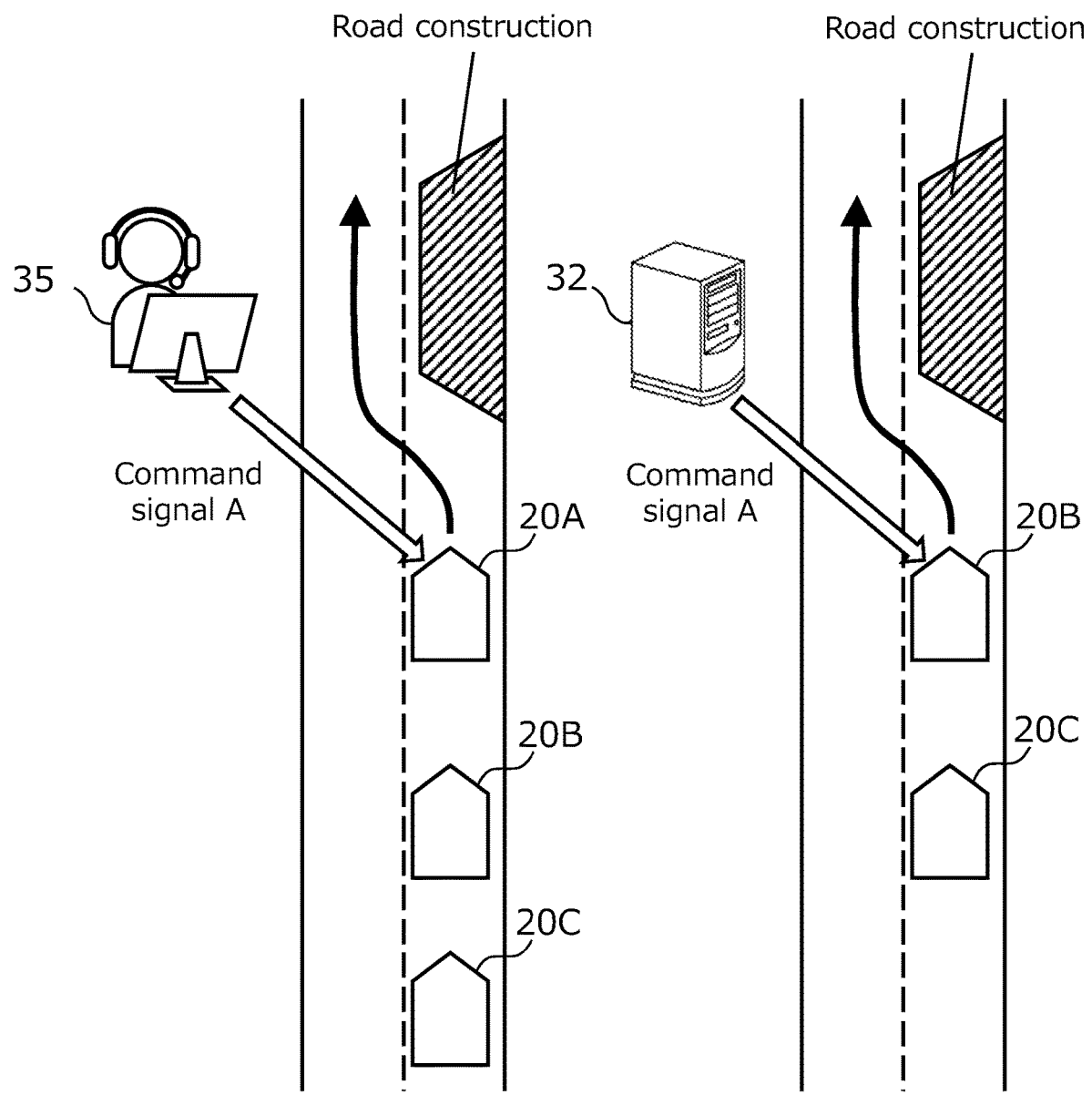
FIG. 5 is a diagram showing a specific example of an assistance cause lasting for a long time.

FIG. 5 is a diagram showing a specific example of an assistance cause lasting for a long time. In the example shown in FIG. 5, three vehicles 20A, 20B, 20C are traveling on a road of which the lanes have been reduced by road construction. In FIG. 5, a road in a right-hand traffic country such as the United States or China is assumed. The vehicle 20A that initially arrives in the lane reduction area requests remote assistance from an operator 35 (which may be an operator 38) to pass through the lane reduction area. The operator 35 confirms the situation of the vehicle 20A upon receipt of an assistance request from the vehicle 20A and transmits a command signal A to the vehicle 20A for the vehicle 20A to pass through the lane reduction area.

Following the vehicle 20A, the vehicle 20B arrives in the lane reduction area. At this time, normally, an assistance request is also generated from the vehicle 20B. However, it is clear that the remote assistance to be performed for the vehicle 20B remains the same in content as the remote assistance performed for the vehicle 20A.

Therefore, the remote assistance managing system according to the present embodiment stores the content of the remote assistance performed by the operator 35 for the vehicle 20A, specifically, the command signal A transmitted by the operator 35 to the vehicle 20A in the server 32. When the vehicle 20B arrives in the lane reduction area, the server 32 automatically transmits the command signal A to the vehicle 20B. Similarly, the server 32 automatically transmits the command signal A to the vehicle 20C when the following vehicle 20C arrives in the lane reduction area. Thus, by applying the command signal A applied to the vehicle 20A also to the subsequent vehicles 20B, 20C, the burden of the operator 35 is greatly reduced.

On the other hand, in the case of the second category cause, there is a low possibility that assistance requests caused by the same assistance cause are generated from a plurality of vehicles. Therefore, when an assistance cause is the second category cause, it is desirable that an operator decides a command signal every time the assistance request is acquired. This is because appropriate remote assistance by an operator can be provided to each vehicle requiring assistance. Therefore, the remote assistance management system of the present disclosure, when an assistance request of which the assistance cause is the second category cause is acquired, applies the command signal determined by an operator only to the vehicle that has transmitted the assistance request.

As described above, in the remote assistance management system of the present disclosure, the method of remote assistance for a vehicle is changed according to the category of the assistance cause of an assistance request that is predicted to occur. That is, when the assistance cause of an assistance request is the first category cause, the command signal initially determined by the operator is also applied to other vehicles from which an assistance request having the same content is predicted to occur. On the other hand, when the assistance cause of an assistance request is the second category cause, the command signal determined by the operator is applied only to the vehicle that has transmitted the assistance request. By such control is performed, the load condition of operators exemplified in FIG. 4 is improved to, for example, a load condition as shown in FIG. 6.

Figure 6:
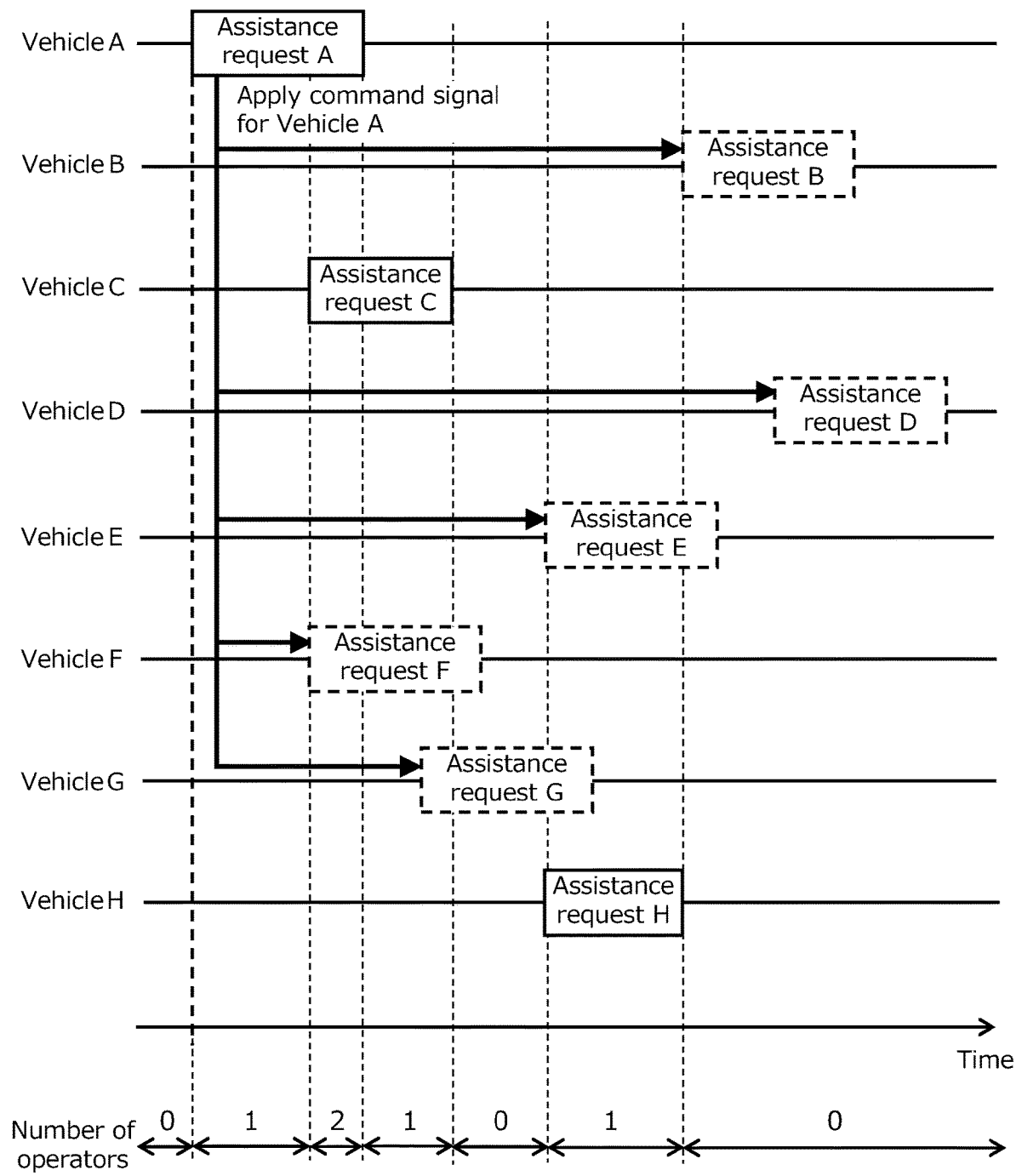
FIG. 6 is a diagram for explaining an outline of a remote assistance management system of the present disclosure.

In the example shown in FIG. 6, the vehicle A generates an assistance request A of which the assistance cause is the first category cause. It is predicted that assistance requests B, D, E, F, G are generated from the vehicles B, D, E, F, G due to the same assistance cause as the assistance request A. In addition, assistance requests C, H of which the assistance causes are the second category cause are predicted to occur from the vehicles C, H.

In this case, according to the remote assistance management system of the present disclosure, first, a command signal for responding to the assistance request A from the vehicle A is determined by an operator, remote assistance by the operator is performed on the vehicle A. The remote assistance management system stores the command signal to the vehicle A determined by the operator. Then, prior to the occurrence of the assistance requests B, D, E, F, G from the vehicles B, D, E, F, G, or when the assistance requests B, D, E, F, G are received, the command signal to the vehicle A is applied to the vehicles B, D, E, F, G. On the other hand, for the vehicles C, H, an operator determines a command signal each time the assistance request C or H is acquired.

Each of the vehicles B, D, E, F, G, which has received the command signal from the remote assist management system, takes the same action as that taken by the vehicle A by remote assistance by an operator. As a result, each of the vehicles B, D, E, F, G can automatically respond to the assistance cause without receiving remote assistance from an operator. Thus, since the number of vehicles to be remotely supported by operators is reduced, it is possible to reduce the load of the operators performing remote assistance of vehicles while maintaining smooth traffic by the remote assistance.

Incidentally, even if an assistance cause that generates an assistance request is the first category cause that lasts for a long time, it does not last forever. For example, taking road construction as an example, the construction that began this morning may have been completed in the evening. If the remote assistance management system recognizes that the assistance cause of the road construction continues despite the completion of the road construction, there is a possibility that an erroneous command signal is applied to a vehicle when an assistance request by another assistance cause occurs at the place where the road construction was performed.

Therefore, when a command signal is determined for an assistance request of which the assistance cause is the first category cause, it is preferable that an effective period (first effective period) is set for applying the command signal to other vehicles. For example, taking the road construction again as an example, only during a period from when remote assistance for coping with the road construction is initially executed until a predetermined time elapses, it is assumed that the command signal used in the remote assistance is applied to other vehicles. The predetermined time is set by an operator in accordance with the situation of the road construction. After a predetermined period of time has elapsed, the operator determines the command signal in response to the assistance request as usual.

Alternatively, when the assistance cause of an assistance request is categorized into the first category cause, an effective period (second effective period) may be set to information indicating that the assistance cause is categorized into the first category cause. For example, when an assistance request occurs for road construction, the assistance cause is generally categorized into the first category cause because it lasts for a long time. However, since road construction is not sustained indefinitely, an effective period is set according to the situation of road construction. By setting the first effective period or the second effective period, it is possible to cope with a change in the situation of the assistance cause.

Figure 7:
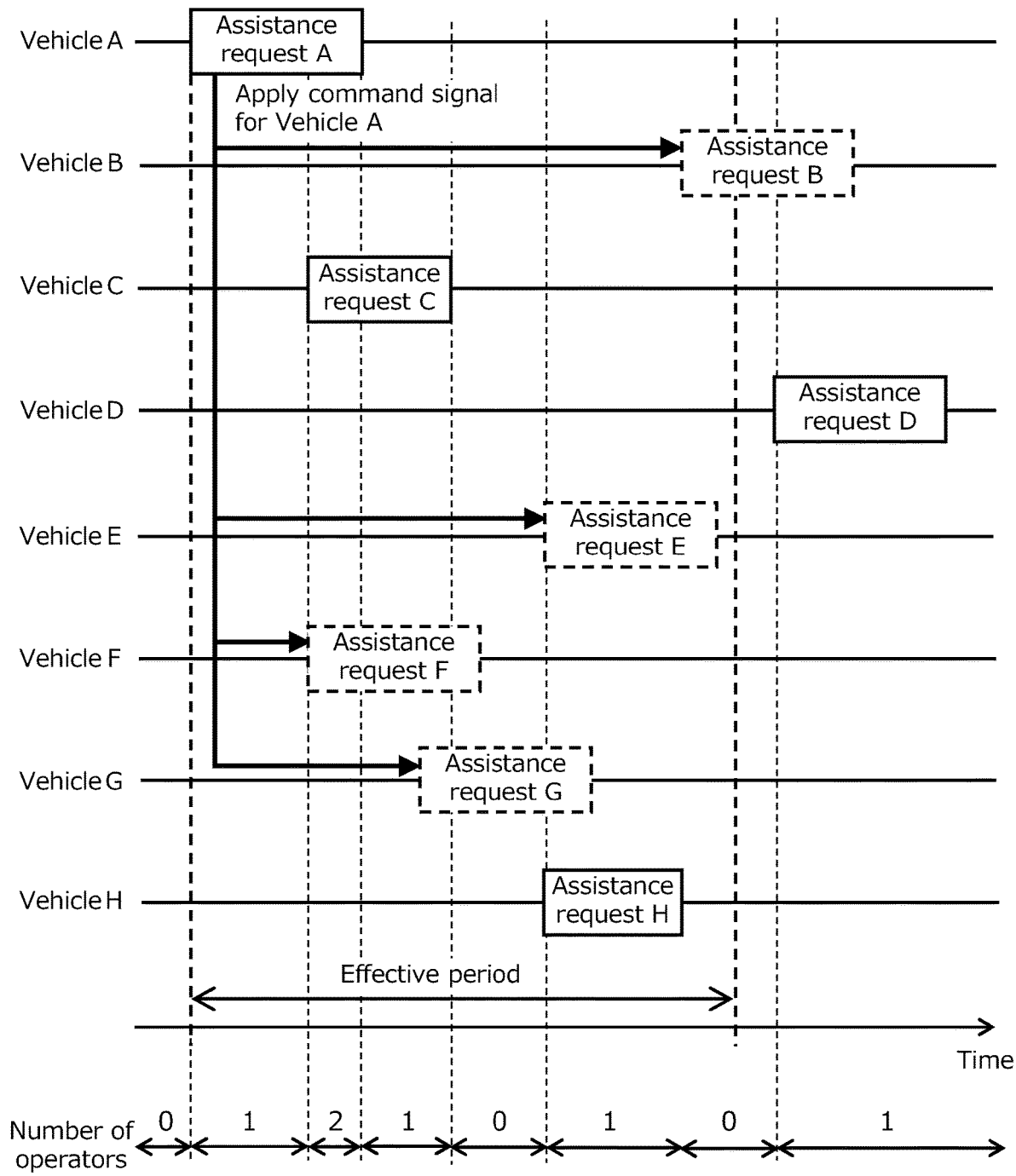
FIG. 7 is a diagram for explaining the outline of the remote assistance management system of the present disclosure.

FIG. 7 shows an example of setting an effective period. The effective period set in the example shown in FIG. 7 is the effective period of applying a command signal for the vehicle A to other vehicles. In this case, the command signal can be transmitted within the effective period to the vehicles B, E, F, G, but the command signal cannot be transmitted within the effective period to the vehicle D. Therefore, the command signal for the vehicle A is not applied to the vehicle D, remote operation by an operator is performed based on the assistance request D. In the example shown in FIG. 7, as compared to the example shown in FIG. 6, the number of vehicles to be remotely assisted by operators is increased by the amount of remote operation for the vehicle D. However, it becomes possible to respond to a change in the situation of the assistance cause, it is possible to reduce the possibility of transmitting an erroneous command signal to a vehicle requiring remote assistance.

As a specific example of an effective period, in the case of road construction, if the time zone of construction is obtained from construction information, the time zone (for example, three hours after 18 o'clock) can be set as the effective period. Further, in the case of the autonomous traveling system in which the map data is updated only once a day, when inconsistency between the map data and an actual road is confirmed after the start of the operation, the period until the next update (i.e., one day) can be set as the effective period.

3. Configuration of Remote Assistance Management System According to First Embodiment Next, the configuration of the remote assistance management system according to the first embodiment of the present disclosure will be described. In the first embodiment, when the program (remote assistance management program) 32c stored in the memory 32b of the server 32 is executed by the processor 32a, the server 32 functions as the remote assistance management system. In the first embodiment, the server 32 functioning as the remote assistance management system is called a remote assistance management planner 32.

Figure 8:
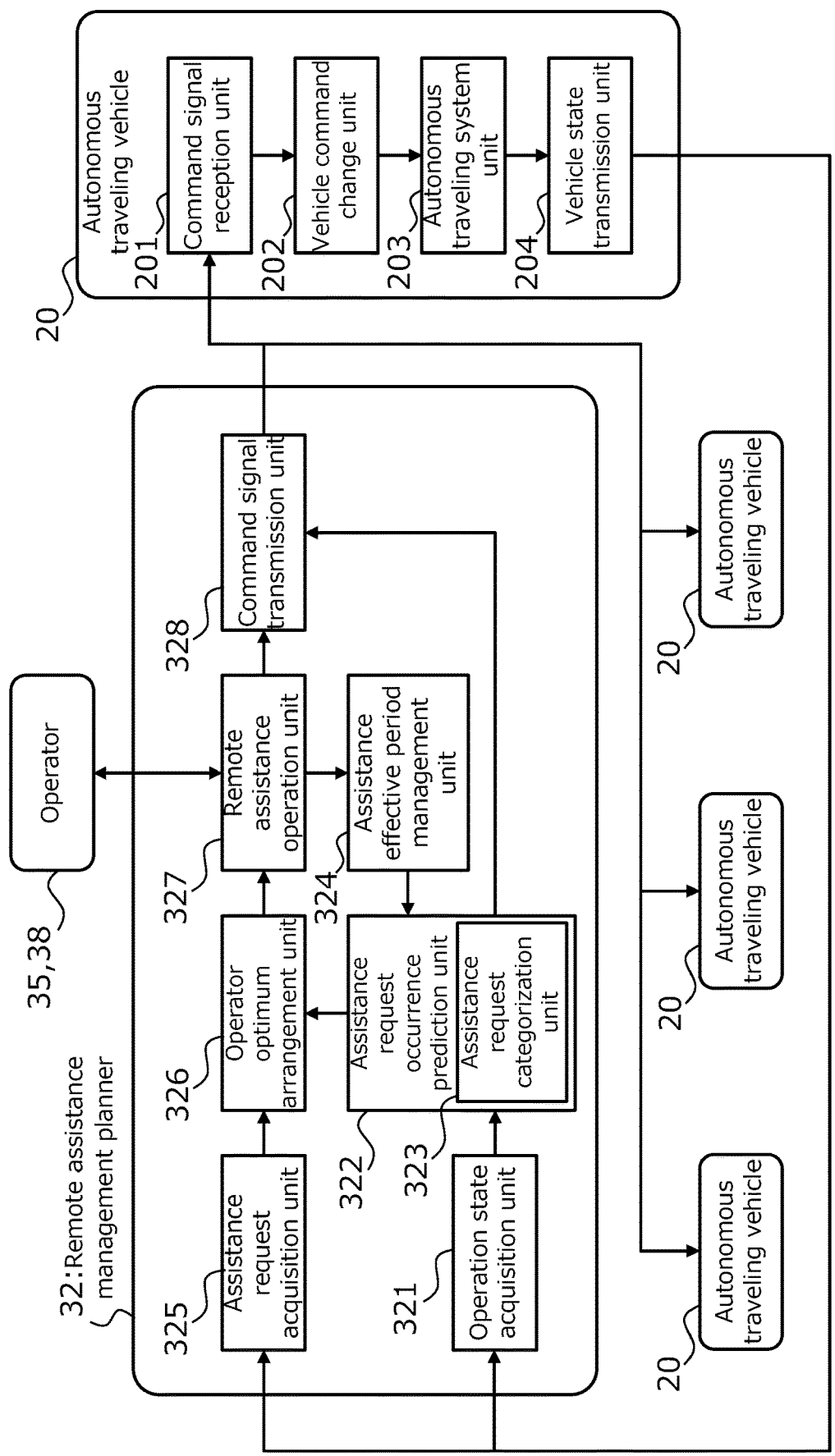
FIG. 8 is a configuration diagram of a remote assistance management system according to a first embodiment of the present disclosure.

FIG. 8 is a configuration diagram of the remote assistance management system according to the first embodiment, that is, the remote assistance management planner 32. The remote assistance management planner 32 includes an operation state acquisition unit 321, an assistance request occurrence prediction unit 322, an assistance request categorization unit 323, an assistance effective period management unit 324, an assistance request acquisition unit 325, an operator optimum arrangement unit 326, a remote assistance operation unit 327, and a command signal transmission unit 328. These are realized as functions of the server 32 as the remote assistance management planner when the program 32c stored in the memory 32b is executed by the processor 32a.

The operation state acquisition unit 321 of the remote assistance management planner 32 acquires operation state information of all the vehicles 20 during operation. The operation state information includes information acquired from each of the vehicles 20 and information acquired from the operation management server that manages the operation of the vehicles 20. If the server 32 also functions as the operation management server, the operation state information is passed from a program that causes the server 32 to function as the operation management server to a program that causes the server 32 to function as the remote assistance management planner.

The assistance request occurrence prediction unit 322 predicts the occurrence of an assistance request in future for each vehicle based on the operation state information of each vehicle acquired by the operation state information unit 321. Prediction of the occurrence of an assistance request is made using the map data. In the map data, the latest construction information and the latest accident information are associated with statistical information including the location and time zone where the assistance request has been generated and the assistance cause that has generated the assistance request, which are collected by the operation of the remote assistance management system. The assistance request occurrence prediction unit 322, by referring to such map data, calculates the probability of the occurrence of an assistance request likely to occur under the operation state of each vehicle. If there is an assistance request of which the occurrence probability is larger than the threshold value, it is determined that the assistance request occurs.

The assistance request occurrence prediction unit 322 includes the assistance request categorization unit 323. The assistance request categorization unit 323 categorizes the assistance cause of the assistance request into the first category cause and the second category cause for each assistance request predicted by the assistance request occurrence prediction unit 322. The determination that the assistance cause is categorized into the first category cause can be made using the map data described above. For example, based on construction information and accident information obtained at the start of the operation, a point at which the assistance request due to the first category cause occurs is predicted. In addition, with respect to a point at which an assistance request frequently occurs other than the point labeled with the first category cause, the assistance cause that generates the assistance request is predicted to be the second category cause.

The assistance request occurrence prediction unit 322 transmits the prediction result of the assistance request and the categorization result of the assistance cause of the assistance request to the operator optimum arrangement unit 326 and the command signal transmission unit 328. The information transmitted to the operator optimum arrangement unit 326 and the command signal transmission unit 328 includes information on the effective period supplied from the assistance effective period management unit 324, which will be described later.

The assistance effective period management unit 324 tags the effective period acquired or updated from the remote assistance operation unit 327 described later for each assistance cause, and stores the information. Here, the term "effective period" is the first effective period or the second effective period described above. The effective period includes an effective period preset as the default value and an effective period set by an operator. The effective period set by an operator is input to the assistance effective period management unit 324 via the remote assistance operation unit 327. The assistance effective period management unit 324 transmits the updated information to the assistance request occurrence prediction unit 322 each time the information on the effective period is updated.

The assistance request acquisition unit 325 acquires assistance requests from the vehicle 20.

The operator optimum arrangement unit 326 arranges the operator 35, 38 available based on the prediction result of the assistance request and the categorization result of the assistance cause of the assistance request received from the assistance request occurrence prediction unit 322. The operator 35, 38 is preferentially arranged for a vehicle from which an assistance request due to the second category cause is predicted to occur. For a vehicle from which an assistance request by the first category cause is predicted to occur, the operator 35, 38 is arranged only for the vehicle in which the occurrence of the assistance request is predicted first. It is not necessary to arrange the operator 35, 38 for subsequent assistance requests having the same assistance cause, since the determination result of an operator for the initial assistance request is applied to them.

The assistance request acquired by the assistance request acquisition unit 325 is assigned to the operator 35, 38 which is arranged in advance as described above. At this time, even if there is a difference between the prediction result of the assistance request and the actually acquired assistance requests, since a certain number of operators are always waiting for an unexpected situation, the operator 35, 38 can be assigned to an assistance request different from the prediction. The operator optimum arrangement unit 326 arranges the operator 35, 38 having high skills for an assistance request having relatively high difficulty levels, and arranges the operator 35, 38 having low skills for an assistance request having relatively low difficulty levels.

The remote assistance operation unit 327 connects the vehicle 20 and the operation terminal 34, 37 operated by the operator 35, 38 in accordance with the combination of the assistance request and the operator 35, 38 determined by the operator optimum arrangement unit 326. Thus, the image photographed by the camera of the vehicle 20 is displayed on the display of the corresponding operation terminal 34, 37, the operator 35, 38 can confirm the situation of the vehicle 20. After confirming the situation of the vehicle 20, the operator 35, 38 operates the operation terminal 34, 37 to execute remote assistance corresponding to the assistance request from the vehicle 20.

The remote assistance by the operators 35, 38 differs depending on whether the assistance cause of the assistance request is the first category cause or the second category cause. Specific examples of the remote assistance for the assistance request by the first category cause may be mentioned as follows. Since the assistance request by the first category cause is typical in many cases, the content of assistance for the assistance request may be determined in advance, and the determination result may be stored.

Concrete Example 1

When lane reduction due to construction is observed on a road with multiple lanes, the operator 35, 8 instructs a traveling path by selecting a lane capable of passing on the road. The observation of lane reduction includes an observation of signs and indicators of lane reduction, as well as observation of pylons installed on the road.

Concrete Example 2

When it is predicted that lane change after the end of a construction section cannot be performed, so that traveling on the specified shortest route (for example, route instructed by a navigation system) is impossible, the operator 35, 38 instructs a route to avoid the construction section even if the construction section has a passable lane.

Concrete Example 3

When a section in which a road is completely closed by construction is observed, the operator 35, 38 instructs a route to avoid the section.

Concrete Example 4

When it is observed that construction is finished earlier than construction information (or accident information) obtained in advance, the operator 35, 38 cancels a lane change instruction or a route change instruction that has been issued for avoiding a construction section so that the vehicle 20 can travel normally. Incidentally, the observation of construction finished, for example, is performed based on image information obtained from the vehicle that has passed through the construction section first, or by the operator 35, 38 which has been remotely assisting the vehicle that has passed through the construction section first.

On the other hand, specific examples of the remote assistance for the assistance request by the second category cause may be mentioned as follows.

Concrete Example 1

When a signal at the next intersection is not observable from the vehicle 20, the vehicle 20 transmits an assistance request to the remote assistance management planner 32, and the operator 35, 38 transmits a determination result of the light color of the signal or a passing/stopping instruction to the vehicle 20.

Concrete Example 2

When it is uncertain whether or not a pedestrian is present on a crosswalk, an assistance request is transmitted to the remote assistance management planner 32, and the operator 35, 38 determines the presence or absence of the pedestrian from image information obtained from the vehicle 20, and transmits a determination result or a passing/stopping instruction to the vehicle 20.

The command signal transmission unit 328 converts the remote assistance operation executed by the operator 35, 38 for the assistance request acquired by the assistance request acquisition unit 325 to a command signal, and transmits the command signal to the vehicle 20 as a target. Further, the command signal transmission unit 328, based on the information received from the assistance request occurrence prediction unit 322, stores the command signal for the assistance request by the first category cause among the command signals determined from the remote assistance operation of the operator 35, 38 in the memory, and transmits the command signal stored to the vehicle 20 as the target. The command signal transmission unit 328 stores the command signal according to the effective period included in the information received from the assistance request occurrence prediction unit 322.

Next, the functions of the vehicle 20, more specifically, the functions of the on-board computer 21 will be described. As shown in FIG. 8, the vehicle 20 includes a command signal reception unit 201, a vehicle command change unit 202, an autonomous traveling system unit 203, a vehicle state transmission unit 204. These are realized as functions of the on-board computer 21 when the program 21c stored in the memory 21b of the on-board computer 21 is executed by the processor 21a.

The command signal reception unit 201 receives a command signal transmitted from the remote assistance management planner 32. The vehicle command change unit 202, based on the command signal obtained by the command signal reception unit 201, extracts information that requires to be changed and converts it to signal information acceptable for the autonomous traveling system unit 203. The autonomous traveling system unit 203 controls the behavior of the vehicle 20 based on the signal information from the command signal reception unit 201. Incidentally, the autonomous traveling technique is already well-known. Since there is no particular limitation on the autonomous traveling technique used in the autonomous traveling system unit 203, a description on the content of the autonomous traveling by the autonomous traveling system unit 203 will be omitted. The vehicle state transmission unit 204 periodically transmits operation state information of the vehicle 20 to the remote assistance management planner 32. The operation state information includes information acquired by the sensor and information acquired by the calculation by the autonomous traveling system unit 203. Further, when the vehicle 20 faces a scene where remote assistance is required, the vehicle state transmission unit 204 transmits an assistance request to the remote assistance management planner 32.

Figure 9:
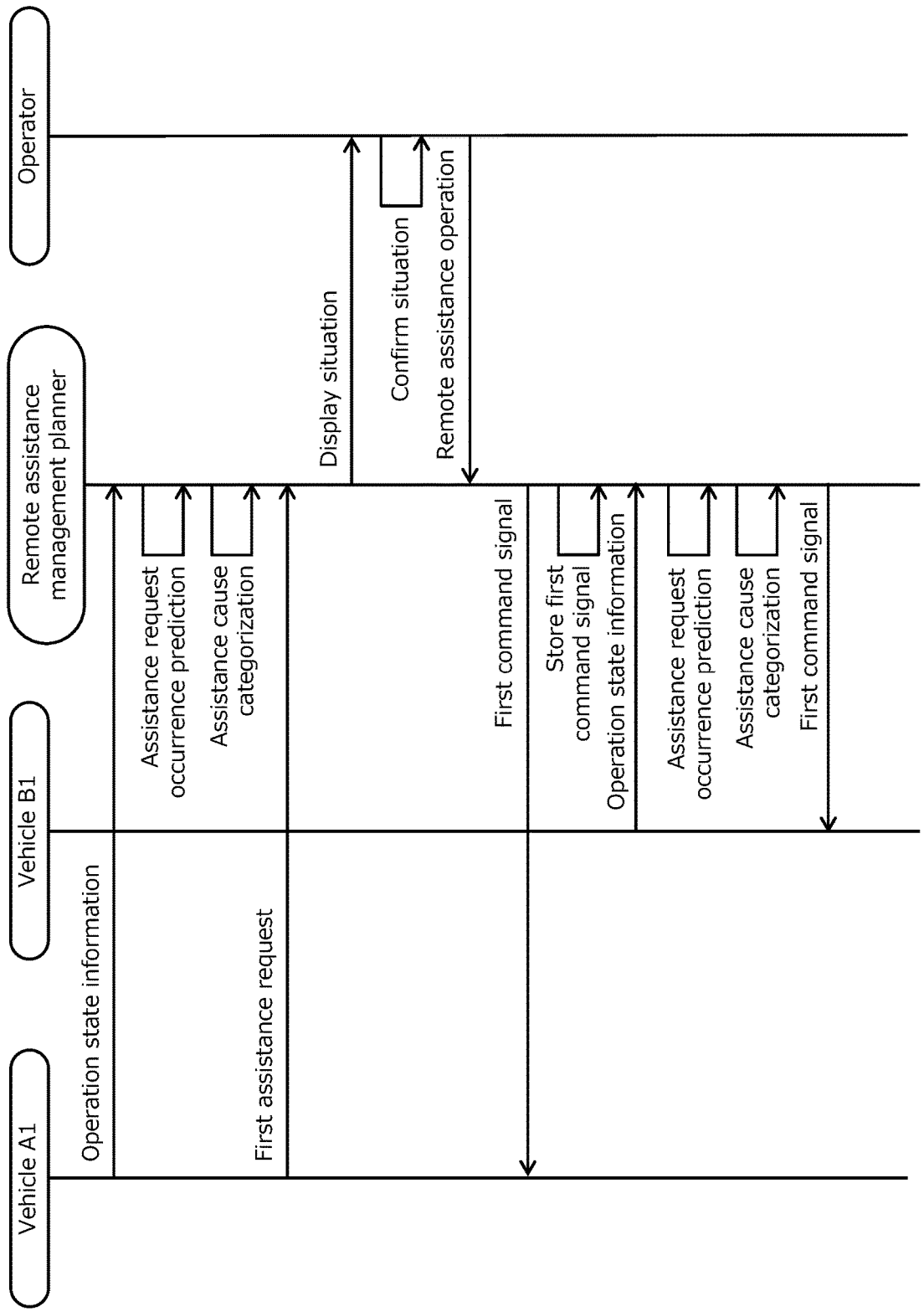
FIG. 9 is a sequence diagram showing a flow of information between a plurality of autonomous traveling vehicles, a remote assistance management planner, and an operator in the case of a first category cause lasting for a long time, by the remote assistance management system according to the first embodiment of the present disclosure.
Figure 10:
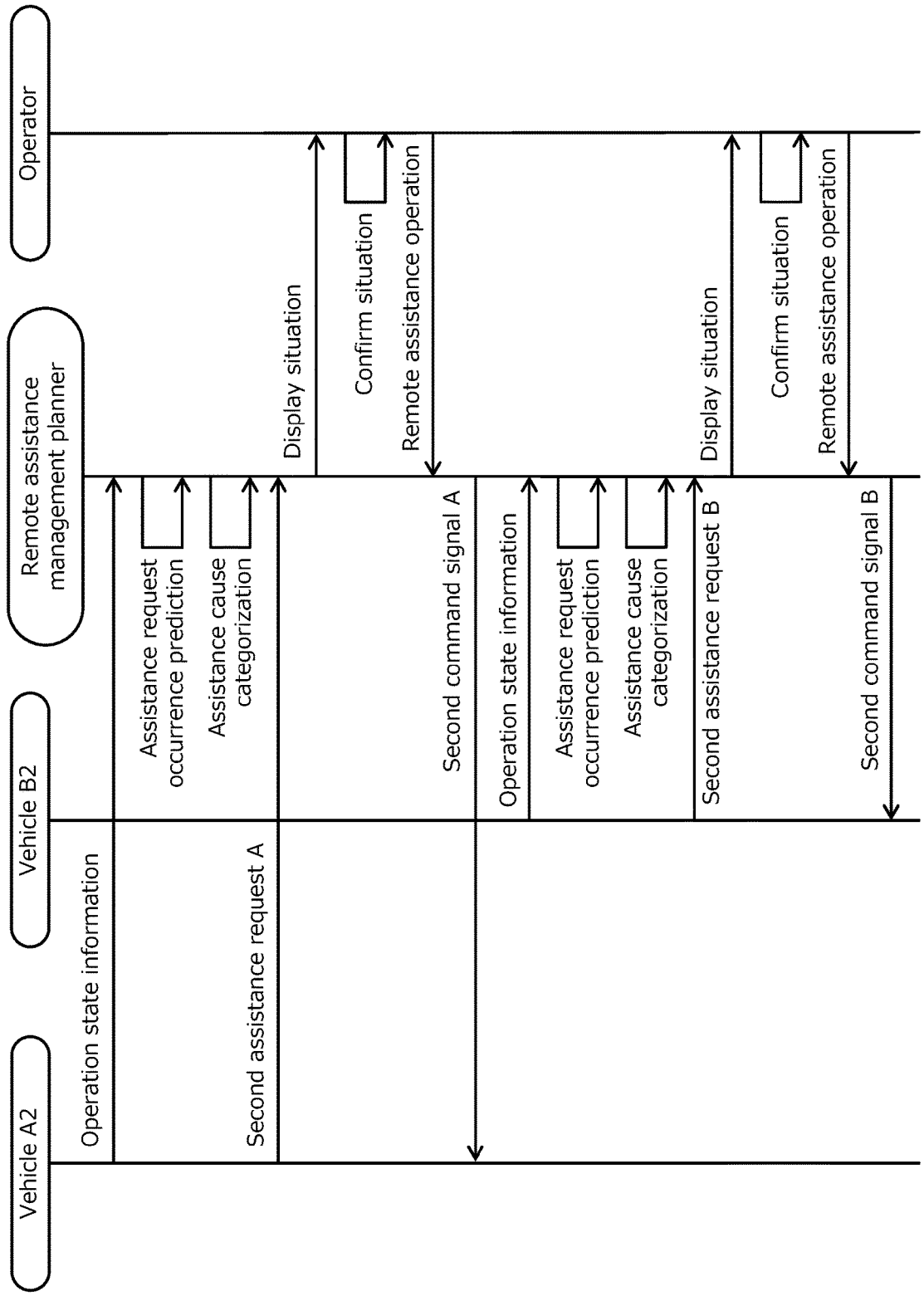
FIG. 10 is a sequence diagram showing a flow of information between a plurality of autonomous traveling vehicles, a remote assistance management planner, and an operator in the case of a second category cause lasting only for a short time, by the remote assistance management system according to the first embodiment of the present disclosure.

Here, a flow of information realized by the remote assistance management system according to the first embodiment configured as described above will be described with reference to FIGS. 9 and 10. FIG. 9 is a sequence diagram showing the flow of information between a plurality of vehicles, the remote assistance management planner, and an operator in the case where the assistance cause is the first category cause, by the remote assistance management system according to the first embodiment. FIG. 10 is a sequence diagram showing the flow of information between a plurality of vehicles, the remote assistance management planner, and an operator in the case where the assistance cause is the second category cause, by the remote assistance management system according to the first embodiment. These sequence diagrams also represent the remote assistance management method according to the first embodiment of the present disclosure.

In the example shown in FIG. 9, first, the operation state information is transmitted from the vehicle A1 (first vehicle) to the remote assistance management planner. In addition, although not shown, the operation state information of the vehicle A1 is also transmitted from the operation management server to the remote assistance management planner.

The remote assistance management planner predicts the occurrence of an assistance request in future of the vehicle A1 based on the acquired operation state information of the vehicle A1. In addition, the remote assistance management planner categorizes the assistance cause of the assistance request predicted to occur into the first category cause and the second category cause. In the example shown in FIG. 9, it is assumed that the assistance cause of the assistance request predicted to occur from the vehicle A1 is categorized into the first category cause.

The vehicle A1 then enters a situation where remote assistance is required as predicted, and transmits an assistance request (first assistance request) to the remote assistance management planner.

The remote assistance management planner receives the first assistance request from the vehicle A1 and determines the optimum arrangement of the operator. Then, the situation of the vehicle A1, specifically, the image photographed by the camera of the vehicle A1 is displayed on the display for the operator selected as the responsibility of the vehicle A1.

The operator confirms the situation of the vehicle A1 from the image displayed on the display, and executes a remote assistance operation for the vehicle A1.

The remote assistance management planner converts the remote assistance operation by the operator to a command signal (first command signal), transmits it to the vehicle A1 and stores it in the memory.

Next, the operation state information is transmitted from the vehicle B1 to the remote assistance management planner. In addition, although not shown, the operation state information of the vehicle B1 is also transmitted from the operation management server to the remote assistance management planner.

The remote assistance management planner predicts the occurrence of an assistance request in future of the vehicle B1 based on the acquired operation state information of the vehicle B1. In addition, the remote assistance management planner categorizes the assistance cause of the assistance request predicted to occur into the first category cause and the second category cause. In the example shown in FIG. 9, it is assumed that the assistance cause of the assistance request predicted to occur from the vehicle B1 is categorized into the first category cause, and further, the assistance cause is the same as the assistance cause of the first assistance request received from the vehicle A1.

The remote assistance management planner transmits the first command signal stored in the memory, i.e., the command signal transmitted to the vehicle A1 also to the vehicle B1.

As is obvious from the example shown in FIG. 9, according to the remote assistance management system of the first embodiment, the same command signal as that determined by the operator is used for the assistance request generated from the same assistance cause. Thus, the number of vehicles to be remotely assisted by the operators is reduced. This makes it possible to reduce the load of operators performing remote assistance of the autonomous traveling vehicles while maintaining smooth traffic by the remote assistance.

In the example shown in FIG. 10, first, the operation state information is transmitted from the vehicle A2 (second vehicle) to the remote assistance management planner. Though not shown, the operation state information of the vehicle A2 is also transmitted from the operation management server to the remote assistance management planner.

The remote assistance management planner predicts the occurrence of an assistance request in future of the vehicle A2 based on the acquired operation state information of the vehicle A2. In addition, the remote assistance management planner categorizes the assistance cause of the assistance request predicted to occur into the first category cause and the second category cause. In the example shown in FIG. 10, it is assumed that the assistance cause of the assistance request predicted to occur from the vehicle A2 is categorized into the second category cause.

The vehicle A2 then enters a situation where remote assistance is required as predicted, and transmits an assistance request (second assistance request A) to the remote assistance management planner.

The remote assistance management planner receives the second assistance request A from the vehicle A2 and determines the optimum arrangement of the operator. Then, the situation of the vehicle A2, specifically, the image photographed by the camera of the vehicle A2 is displayed on the display for the operator selected as the responsibility of the vehicle A2.

The operator confirms the situation of the vehicle A2 from the image displayed on the display, and executes a remote assistance operation for the vehicle A2.

The remote assistance management planner converts the remote assistance operation by the operator to a command signal (second command signal A) and transmits it to the vehicle A2. However, unlike the case of the example shown in FIG. 9, the second command signal A is not stored in the memory.

Next, the operation state information is transmitted from the vehicle B2 (second vehicle) to the remote assistance management planner. In addition, although not shown, the operation state information of the vehicle B2 is also transmitted from the operation management server to the remote assistance management planner.

The remote assistance management planner predicts the occurrence of an assistance request in future of the vehicle B2 based on the acquired operation state information of the vehicle B2. In addition, the remote assistance management planner categorizes the assistance cause of the assistance request predicted to occur into the first category cause and the second category cause. In the example shown in FIG. 10, it is assumed that the assistance cause of the assistance request predicted to occur from the vehicle B2 is categorized into the second category cause.

The vehicle B2 then enters a situation where remote assistance is required as predicted, and transmits an assistance request (second assistance request B) to the remote assistance management planner.

The remote assistance management planner receives the second assistance request B from the vehicle B2 and determines the optimum arrangement of the operator. Then, the situation of the vehicle B2, specifically, the image photographed by the camera of the vehicle B2 is displayed on the display for the operator selected as the responsibility of the vehicle B2.

The operator confirms the situation of the vehicle B2 from the image displayed on the display, and executes a remote assistance operation for the vehicle B2.

The remote assistance management planner converts the remote assistance operation by the operator to a command signal (second command signal B) and transmits it to the vehicle B2.

As is obvious from the example shown in FIG. 10, according to the remote assistance management system of the first embodiment, when the assistance cause generating the assistance request is the second category cause, the operator determines the command signal every time the assistance request is acquired. Thus, appropriate remote assistance by the operator can be provided to the vehicle requiring assistance.

4. Configuration of Remote Assistance Management System According to Second Embodiment Next, the configuration of the remote assistance management system according to the second embodiment of the present disclosure will be described. In the second embodiment, when the program 32c stored in the memory 32b of the server 32 is executed by the processor 32a, the server 32 functions as a part of the remote assistance management system. The processor 21a executes the program 21c stored in the memory 21b of the on-board computer 21, whereby the on-board computer 21 functions as a part of the remote assistance management system. The server 32 and the on-board computer 21 mounted on each of the vehicles 20 under the supervision of the monitoring center 30 are connected via a communication network, thereby configuring the remote assistance management system according to the second embodiment. In the second embodiment, the server 32 that functions as a part of the remote assistance management system is referred to as the remote assistance management planner 32.

Figure 11:
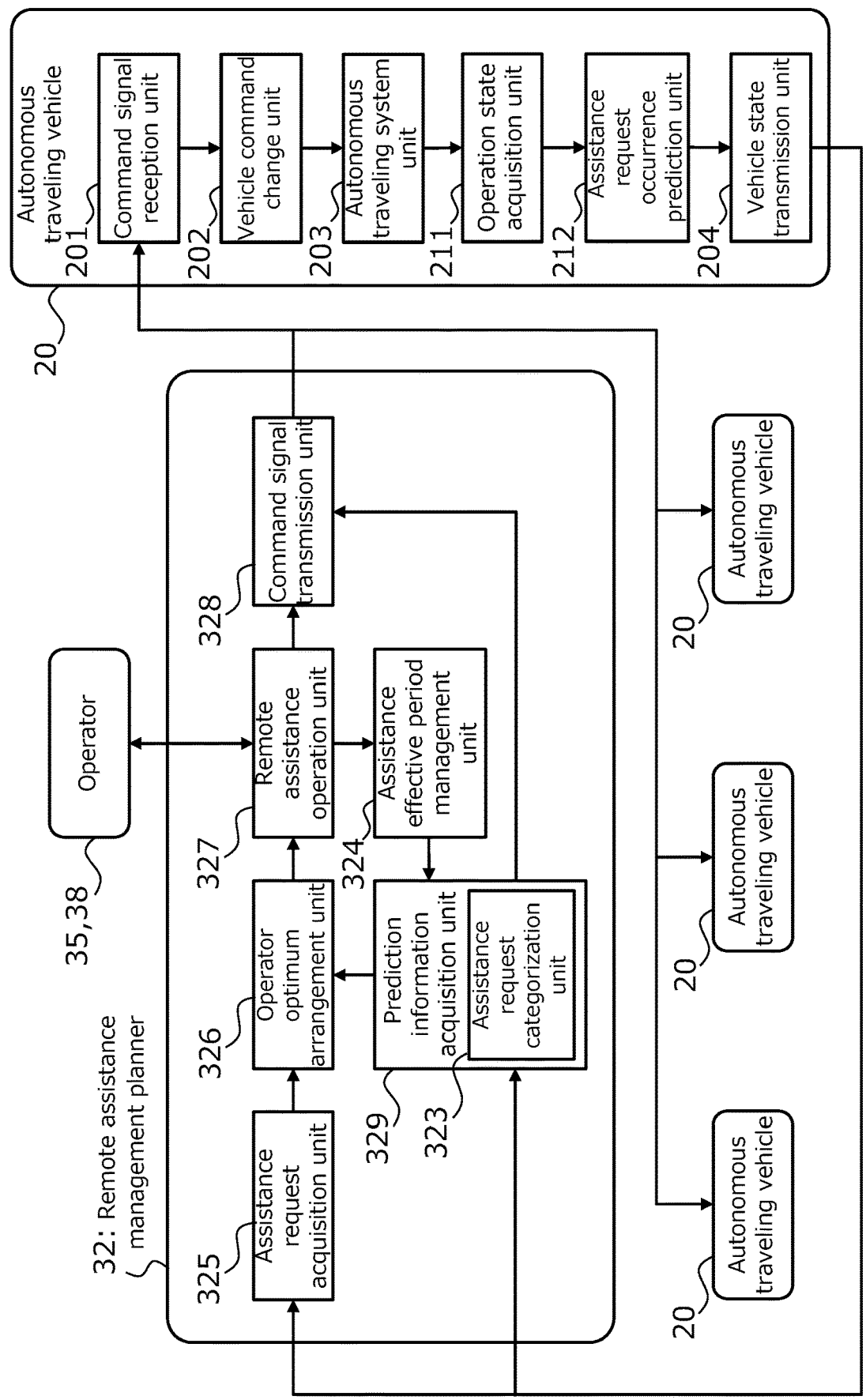
FIG. 11 is a configuration diagram of a remote assistance management system according to a second embodiment of the present disclosure.

FIG. 11 is a configuration diagram of the remote assistance management system according to the second embodiment. In the second embodiment, a part of the functions of the remote assistance management planner 32 according to the first embodiment is transferred to the vehicle 20. As shown in FIG. 11, the vehicle 20 according to the second embodiment includes a command signal reception unit 201, a vehicle command change unit 202, an autonomous traveling system unit 203, and a vehicle state transmission unit 204, an operation state acquisition unit 211, and an assistance request occurrence prediction unit 212. These are realized as functions of the on-board computer 21 when the program 21c stored in the memory 21b of the on-board computer 21 is executed by the processor 21a.

The operation state acquisition unit 211 acquires operation state information of the vehicle 20 using a sensor provided in the vehicle 20. Further, the target trajectory of the vehicle 20 calculated by the autonomous traveling system unit 203 is also acquired as the operation state information of the vehicle 20. In the case of configuring the assistance request occurrence prediction unit 212 as a part of the autonomous traveling system unit 203, it is not necessary to provide the operation state acquisition unit 211 independently.

The assistance request occurrence prediction unit 212 predicts the occurrence of an assistance request in future based on the operation state information of the vehicle 20 acquired by the operation information acquisition unit 211. Prediction of the occurrence of an assistance request is made using the map data. In the map data, the latest construction information and the latest accident information are associated with statistical information including the location and time zone where the assistance request has been generated and the assistance cause that has generated the assistance request, which are collected by the operation of the remote assistance management system. The map data is periodically distributed from the server 32. The assistance request occurrence prediction unit 212 calculates the probability of the occurrence of an assistance request by, for example, comparing the map data with the target trajectory. If there is an assistance request of which the occurrence probability is larger than the threshold value, it is determined that the assistance request occurs.

The assistance request occurrence prediction unit 212 according to the second embodiment performs prediction using only information acquired in the vehicle 20. Although the first embodiment is more advantageous in terms of the prediction accuracy of the occurrence of an assistance request, according to the second embodiment, the occurrence of an assistance request in the vehicle 20 can be predicted with high responsiveness. The prediction result of the assistance request by the assistance request occurrence prediction unit 212 is transmitted from the vehicle state transmission unit 204 to the remote assistance management planner 32.

The remote assistance management planner 32 according to the second embodiment includes a prediction information acquisition unit 329, an assistance request categorization unit 323, an assistance effective period management unit 324, an assistance request acquisition unit 325, an operator optimum arrangement unit 326, a remote assistance operation unit 327, and a command signal transmission unit 328. These are realized as functions of the server 32 as the remote assistance management planner when the program 32c stored in the memory 32b is executed by the processor 32a.

The prediction information acquisition unit 329 receives the prediction result of the assistance request transmitted from each vehicle 20. In the remote assistance management planner 32 according to the second embodiment, the prediction information acquisition unit 329 includes the assistance request categorization unit 323. The assistance request categorization unit 323 categorizes the assistance cause of the assistance request predicted by each vehicle 20 into the first category cause and the second category cause by referring to, for example, the map data described above.

The processing performed by the remote assistance management planner 32 according to the second embodiment is the same as that of the first embodiment except that the vehicle 20 predicts the occurrence of an assistance request in future. Therefore, the description of the functions of the assistance effective period management unit 324, the assistance request acquisition unit 325, the operator optimum arrangement unit 326, the remote assistance operation unit 327, and the command signal transmission unit 328 is omitted.

Figure 12:
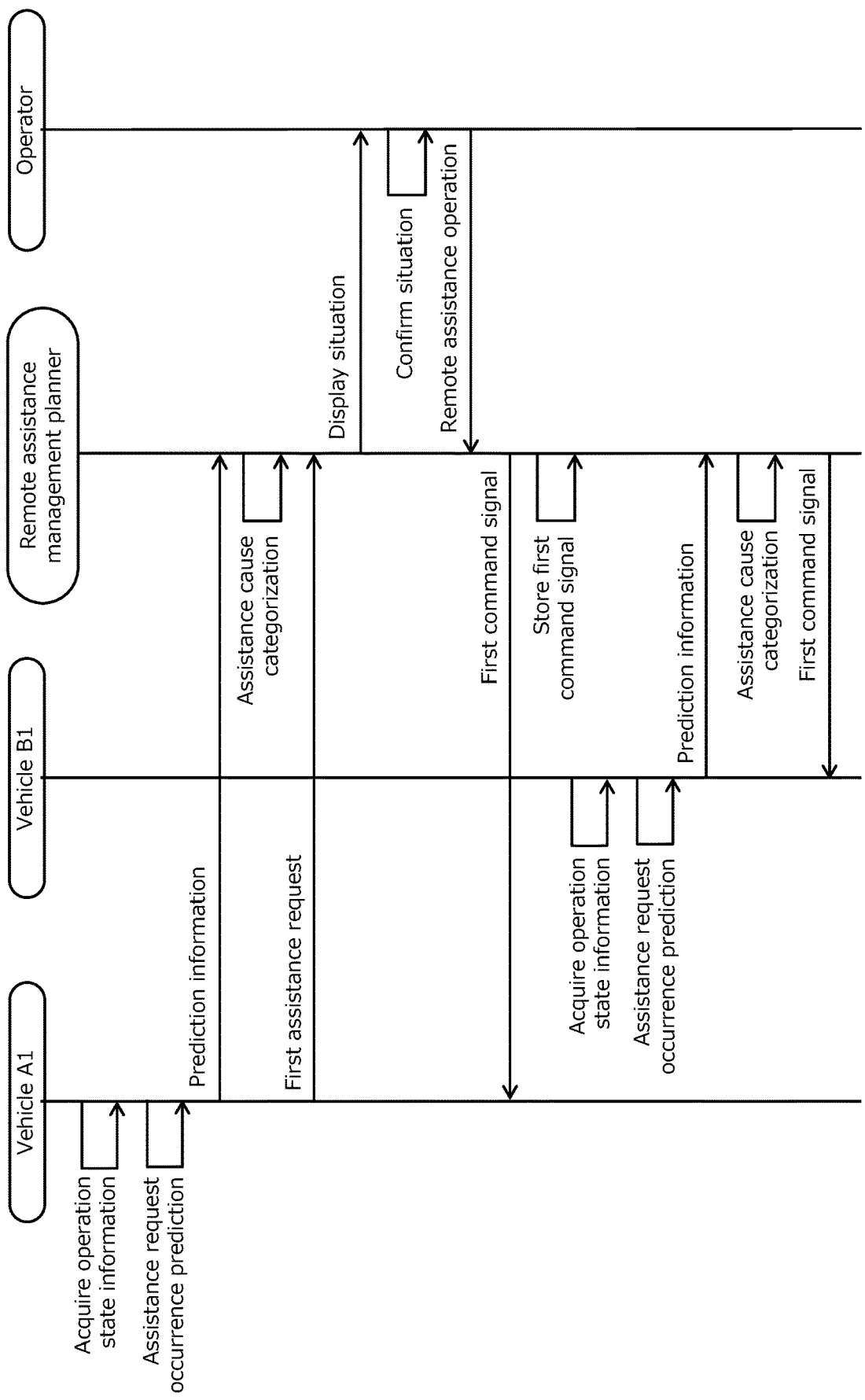
FIG. 12 is a sequence diagram showing a flow of information between a plurality of autonomous traveling vehicles, a remote assistance management planner, and an operator in the case of a first category cause lasting for a long time, by the remote assistance management system according to the second embodiment of the present disclosure.

Next, a flow of information realized by the remote assistance management system according to the second embodiment configured as described above will be described with reference to FIG. 12. FIG. 12 is a sequence diagram showing the flow of information between a plurality of vehicles, the remote assistance management planner, and an operator in the case where the assistance cause is the first category cause, by the remote assistance management system according to the second embodiment. This sequence diagram also represents the remote assistance management method according to the second embodiment of the present disclosure.

In the example shown in FIG. 12, the vehicle A1 (first vehicle) acquires operation state information from the sensor and the calculation result of the autonomous traveling system, and predicts the occurrence of an assistance request based on the obtained operation state information. The vehicle A1 transmits the prediction result of the assistance request to the remote assistance management planner as prediction information.

The remote assistance management planner categorizes the assistance cause included in the prediction information acquired from the vehicle A1 into the first category cause and the second category cause. In the example shown in FIG. 12, it is assumed that the assistance cause of the assistance request predicted by the vehicle A1 is categorized into the first category cause.

The vehicle A1 then enters a situation where remote assistance is required as predicted by itself, and transmits an assistance request (first assistance request) to the remote assistance management planner.

The remote assistance management planner receives the first assistance request from the vehicle A1 and determines the optimum arrangement of the operator. Then, the situation of the vehicle A1, specifically, the image photographed by the camera of the vehicle A1 is displayed on the display for the operator selected as the responsibility of the vehicle A1.

The operator confirms the situation of the vehicle A1 from the image displayed on the display, and executes a remote assistance operation for the vehicle A1.

The remote assistance management planner converts the remote assistance operation by the operator to a command signal (first command signal), transmits it to the vehicle A1 and stores it in the memory.

On the other hand, the vehicle B1 acquires operation state information from the sensor and the calculation result of the autonomous traveling system, and predicts the occurrence of an assistance request based on the obtained operation state information. The vehicle B1 transmits the prediction result of the assistance request to the remote assistance management planner as prediction information. These processes by the vehicle B1 are performed completely independently of the vehicle A1.

The remote assistance management planner categorizes the assistance cause included in the prediction information acquired from the vehicle B1 into the first category cause and the second category cause. In the example shown in FIG. 12, it is assumed that the assistance cause of the assistance request predicted by the vehicle B1 is categorized into the first category cause, and further, the assistance cause is the same as the assistance cause of the first assistance request received from the vehicle A1.

The remote assistance management planner transmits the first command signal stored in the memory, i.e., the command signal transmitted to the vehicle A1 also to the vehicle B1.

As is obvious from the example shown in FIG. 12, similarly to the first embodiment, according to the remote assistance management system of the second embodiment, the same command signal as that determined by the operator is used for the assistance request generated from the same assistance cause. Thus, the number of vehicles to be remotely assisted by the operators is reduced. This makes it possible to reduce the load of operators performing remote assistance of the autonomous traveling vehicles while maintaining smooth traffic by the remote assistance.

5. Other Embodiments

The assistance request occurrence prediction unit may be disposed in each of the remote assistance management planner 32 and the vehicle 20, and may be switched according to the communication environment.

What is claimed is:

1. A remote assistance management system in communication with a plurality of autonomous traveling vehicles for letting an operator provide remote assistance in response to an assistance request from an autonomous traveling vehicle, the system comprising:
    at least one memory storing at least one program; and
    at least one processor coupled with the at least one memory,
    wherein the at least one program is configured to cause the at least one processor to execute:
        predicting an occurrence of an assistance request in future based on operation states of the plurality of autonomous traveling vehicles;
        categorizing a cause of an assistance request predicted to occur into a first category cause and a second category cause,
    wherein the first category cause includes causes that are common to other autonomous vehicles, and the second category cause includes causes that are dependent upon an individual autonomous traveling vehicle;
        receiving an assistance request from the plurality of autonomous traveling vehicles;
        in response to acquiring a first assistance request of which the cause is the first category cause from a first vehicle, executing a remote assistance operation for the first vehicle from the operator,
        converting the remote assistance operation for the first vehicle into a first command signal,
        transmitting the first command signal to the first vehicle at a first time, and
        at a second time later than the first time, automatically transmitting the first command signal to another autonomous traveling vehicle from which the first assistance request is predicted to occur; and
        in response to acquiring a second assistance request of which the cause is the second category cause from a second vehicle, executing a second remote assistance operation from the operator,
        converting the second remote assistance operation into a second command signal, and
        transmitting the second command signal only to the second vehicle among the plurality of autonomous vehicles.

2. The remote assistance management system according to claim 1,
    wherein the at least one program is configured to cause the at least one processor to further execute setting an effective period during which the first command signal is automatically transmitted to the another autonomous traveling vehicle.

3. The remote assistance management system according to claim 1,
    wherein the at least one program is configured to cause the at least one processor to further execute setting an effective period during which the cause of the first assistance request is categorized into the first category cause.

4. The remote assistance management system according to claim 1,
    wherein the at least one program is configured to cause the at least one processor to further execute arranging the operator to an autonomous traveling vehicle from which the second assistance request is predicted to occur in preference to an autonomous traveling vehicle from which the first assistance request is predicted to occur.

5. The remote assistance management system according to claim 1,
    wherein the at least one program is configured to cause the at least one processor to execute the predicting an occurrence of an assistance request in future and the categorizing a cause of an assistance request predicted to occur, by referring to map data with which statistical information related to past remote assistance is associated.

6. The remote assistance management system according to claim 5, wherein the map data is associated with at least one of construction information and accident information.

7. The remote assistance management system according to claim 6, wherein the at least one program is configured to cause the at least one processor to further execute:
by referring to the map data associated with at least one of construction information and accident information, calculating a probability of an assistance request to occur based on the operation state of each vehicle; and
predicting the occurrence of the assistance request in the future based on the occurrence probability being larger than a threshold value.

8. The remote assistance management system according to claim 5,
wherein the at least one memory and the at least one processor are provided on a server in communication with the plurality of autonomous traveling vehicles, and
the server is configured to:
acquire operation states of the plurality of autonomous traveling vehicles respectively; and
predict an occurrence of an assistance request in future based on the operation states of the plurality of autonomous traveling vehicles by referring to the map data.

9. The remote assistance management system according to claim 5,
wherein the at least one memory and the at least one processor are distributed to an on-board computer mounted on each of the plurality of autonomous traveling vehicles and a server in communication with the on-board computer, and
the on-board computer is configured to:
acquire an operation state of a target autonomous traveling vehicle on which the on-board computer is mounted using a sensor of the target autonomous traveling vehicle;
acquire the map data from the server;
predict an occurrence of an assistance request in future based on the operation state of the target autonomous traveling vehicle by referring to the map data; and
when an assistance request is predicted to occur, transmit information relating to prediction of an occurrence of the assistance request to the server.

10. A remote assistance management method for a plurality of autonomous traveling vehicles capable of receiving remote assistance from an operator, the method comprising:
predicting an occurrence of an assistance request in future from the plurality of autonomous traveling vehicles to the operator based on operation states of the plurality of autonomous traveling vehicles;
categorizing a cause of an assistance request predicted to occur into a first category cause and a second category cause,
wherein the first category cause includes causes that are common to other autonomous vehicles, and the second category cause includes causes that are dependent upon an individual autonomous traveling vehicle;
receiving an assistance request from the plurality of autonomous traveling vehicles;
in response to acquiring a first assistance request of which the cause is the first category cause from a first vehicle, executing a remote assistance operation for the first vehicle from a remote operator,
converting the remote assistance operation for the first vehicle into a first command signal,
transmitting the first command signal to the first vehicle at a first time, and
at a second time later than the first time, automatically transmitting the first command signal to another autonomous traveling vehicle from which the first assistance request is predicted to occur; and
in response to acquiring a second assistance request of which the cause is the second category cause from a second vehicle, executing a second remote assistance operation from the operator,
converting the second remote assistance operation into a second command signal, and
transmitting the second command signal only to the second vehicle among the plurality of autonomous vehicles.

11. A non-transitory computer-readable storage medium storing a remote assistance management program, the remote assistance management program being a program causing a computer to communicate with a plurality of autonomous traveling vehicles and let an operator provide remote assistance in response to an assistance request from an autonomous traveling vehicle,
wherein the remote assistance management program is configured to cause the computer to execute:
predicting an occurrence of an assistance request in future based on operation states of the plurality of autonomous traveling vehicles;
categorizing a cause of an assistance request predicted to occur into a first category cause and a second category cause,
wherein the first category cause includes causes that are common to other autonomous vehicles, and the second category cause includes causes that are dependent upon an individual autonomous traveling vehicle;
receiving an assistance request from the plurality of autonomous traveling vehicles;
in response to acquiring a first assistance request of which the cause is the first category cause from a first vehicle, executing a remote assistance operation for the first vehicle from the operator,
converting the remote assistance operation for the first vehicle into a first command signal,
transmitting the first command signal to the first vehicle at a first time, and
at a second time later than the first time, automatically transmitting the first command signal to another autonomous traveling vehicle from which the first assistance request is predicted to occur; and
in response to acquiring a second assistance request of which the cause is the second category cause from a second vehicle, executing a second remote assistance operation from the operator,
converting the second remote assistance operation into a second command signal, and
transmitting the second command signal only to the second vehicle among the plurality of autonomous vehicles.

* * * * *